United States Patent
Takagi et al.

(10) Patent No.: US 10,281,963 B2
(45) Date of Patent: May 7, 2019

(54) IMAGE DISPLAY DEVICE AND HEAD MOUNTED IMAGE DISPLAY DEVICE

(71) Applicant: SEIKO EPSON CORPORATION, Tokyo (JP)

(72) Inventors: Masayuki Takagi, Matsumoto (JP); Toshiaki Miyao, Matsumoto (JP); Takeshi Fujishiro, Shiojiri (JP); Takahiro Totani, Suwa (JP); Takashi Takeda, Suwa (JP); Akira Komatsu, Tatsuno-machi (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 163 days.

(21) Appl. No.: 14/955,622

(22) Filed: Dec. 1, 2015

(65) Prior Publication Data
US 2016/0179148 A1 Jun. 23, 2016

(30) Foreign Application Priority Data

Dec. 22, 2014 (JP) ................................. 2014-258728
Sep. 24, 2015 (JP) ................................. 2015-187496

(51) Int. Cl.
*G06F 1/20* (2006.01)
*G02B 27/01* (2006.01)
*G06F 1/16* (2006.01)

(52) U.S. Cl.
CPC ......... *G06F 1/203* (2013.01); *G02B 27/0176* (2013.01); *G06F 1/163* (2013.01); *G02B 2027/0178* (2013.01)

(58) Field of Classification Search
CPC ........ G02B 27/0176; G02B 2027/0178; G06F 1/163; G06F 1/203
See application file for complete search history.

(56) References Cited

U.S. PATENT DOCUMENTS

| | | | |
|---|---|---|---|
| 6,324,055 B1 * | 11/2001 | Kawabe | G06F 1/1616 361/679.54 |
| 6,882,480 B2 | 4/2005 | Yanagisawa | |
| 2004/0046940 A1 | 3/2004 | Yanagisawa | |
| 2005/0007517 A1 * | 1/2005 | Anandan | G02F 1/133603 349/69 |
| 2007/0177239 A1 | 8/2007 | Tanijiri et al. | |

FOREIGN PATENT DOCUMENTS

| | | |
|---|---|---|
| JP | H11-084310 A | 3/1999 |
| JP | 2004-070116 A | 3/2004 |
| JP | 2008-099222 A | 4/2008 |
| JP | 2010-256619 A | 11/2010 |

* cited by examiner

*Primary Examiner* — Stacy Khoo
(74) *Attorney, Agent, or Firm* — Oliff PLC

(57) ABSTRACT

An image display device includes a display unit that displays an image so as to be visually recognized by an observer, a holding member that holds the display unit and has at least a portion thereof exposed to the outside, and a heat conduction member, having a sheet shape, which is connected to the holding member. The display unit includes an image forming device that forms the image. The heat conduction member comes into contact with the image forming device so as to be capable of heat conduction, and transmits heat of the image forming device to the holding member.

10 Claims, 18 Drawing Sheets

IMAGE DISPLAY DEVICE AND HEAD MOUNTED IMAGE DISPLAY DEVICE

BACKGROUND

1. Technical Field

The present invention relates to an image display device and a head mounted image display device.

2. Related Art

Hitherto, head mounted displays (HMD) mounted on the head of an observer have been known as image display devices that display an image (for example, see JP-A-2008-99222).

The HMD disclosed in JP-A-2008-99222 includes a video display device that displays a video so as to be capable of being visually recognized by an observer as a virtual image, an eyepiece optical system, and a supporting unit. Among these, the eyepiece optical system guides video light emitted from the video display device to an observer's eyes, and the supporting unit supports the eyepiece optical system in front of the eyes of the observer and is equivalent to a frame of spectacles.

In addition, the video display device includes a light source constituted by a light emitting diode (LED), a heat absorbing member, a flexible printed circuit (FPC), and a housing that accommodates the above-mentioned components therein.

Among these, the light source is fixed to a land portion of the FPC by soldering. The heat absorbing member is fixed to a surface on a side opposite to a mounting surface of the light source in the FPC by solder. In addition, a shielding wire is connected to the heat absorbing member, and the shielding wire is exposed to the outside of the housing. Thereby, heat generated by the light source is absorbed into the heat absorbing member, is guided to the outside of the housing through the shielding wire, and is radiated. That is, in the HMD disclosed in JP-A-2008-99222, the shielding wire is used as a heat conduction member.

However, in the HMD disclosed in JP-A-2008-99222, the shielding wire transmits the heat absorbed by the heat absorbing member to the outside of the housing. For this reason, there is a tendency for the contact area between the shielding member and the heat absorbing member to be reduced, and thus the heat conduction efficiency of the shielding member is low, which results in a problem in that it is not possible to radiate heat from the light source with a good efficiency. In addition, in a configuration of the HMD, there is the possibility of a light source or a liquid crystal panel being shifted due to the stress of the shielding wire, and furthermore, there is a problem in that an image formed by the light source and the liquid crystal panel and projected may be shifted.

As described above, when heat generated by the light source is not able to be radiated with a good efficiency, there is an increased possibility that heat is transmitted to a lateral side on the observer side in the housing. In this manner, when the temperature of the lateral side on the observer side increases, the observer feels heat, which results in a problem of deterioration in the feeling of wearing.

SUMMARY

An advantage of some aspects of the invention is to provide an image display device and a head mounted image display device which are capable of radiating heat from an image forming device with a good efficiency and suppressing the shift of an image to be projected. In addition, another advantage of some aspects of the invention is to provide an image display device which is capable of improving the feeling of wearing.

An image display device according to a first aspect of the invention includes a display unit that displays an image so as to be visually recognized by an observer, a holding member that holds the display unit and has at least a portion thereof exposed to the outside, and a heat conduction member, having a sheet shape, which is connected to the holding member. The display unit includes an image forming device that forms the image. The heat conduction member comes into contact with the image forming device so as to be capable of heat conduction, and transmits heat of the image forming device to the holding member.

The image visually recognized by the observer may be a real image which is directly viewed by the observer or may be a virtual image.

According to the first aspect, since the heat conduction member is formed in a sheet shape, it is possible to increase the contact area between the image forming device and the holding member compared to a case where a heat conduction member constituted by a shielding wire is adopted, and to transmit heat from the image forming device to the holding member with a good efficiency. In addition, since a portion of the holding member, having heat of the image forming device transmitted thereto, is exposed to the outside, it is possible to radiate the transmitted heat at the portion exposed to the outside. Therefore, it is possible to effectively cool the image forming device.

In addition, it is possible to make the stress of the heat conduction member less likely to be applied to the image forming device by adopting the sheet-shaped heat conduction member, compared to a case where a heat conduction member constituted by a shielding wire is adopted. Therefore, it is possible to reduce the possibility of the position of the image forming device being shifted and to suppress the shift of an image emitted from the image forming device.

In the first aspect, it is preferable that the image forming device includes a light source device and an optical modulation device that modulates light emitted from the light source device, and the light source device and the optical modulation device are integrated with each other.

According to such a configuration, since the light source device and the optical modulation device are integrated with each other, it is possible to transmit heat generated by each of the devices to the holding member even when the heat conduction member is connected to either of the devices. Therefore, it is possible to effectively cool the light source device and the optical modulation device.

In addition, since the light source device and the optical modulation device which constitute the image forming device are integrated with each other, it is possible to increase the weight of a connection destination of the heat conduction member, compared to a case where the heat conduction member is connected to either the light source device or the optical modulation device. Accordingly, even when the stress of the heat conduction member is applied to the image forming device, it is possible to further reduce the possibility of the position of the image forming device being shifted. Thereby, it is possible to reliably suppress the shift of an image emitted from the image forming device.

In the first aspect, it is preferable that the heat conduction member is disposed at a position where a light path of light emitted from the image forming device is not blocked.

Examples of the position where the light path of the light is not blocked may include a surface on a side opposite to a light emission side in the light source device, and a lateral side along a traveling direction of the light in the light source device and the optical modulation device.

According to such a configuration, the heat conduction member does not block a light path of light emitted from the image forming device, and thus an image to be formed can be made to be reliably visually recognized. In addition, since the heat conduction member can be connected to the entire surface at a position where the light path of the light is not blocked, it is possible to increase the contact area between the image forming device and the heat conduction member, thereby allowing heat of the image forming device to be transmitted to the holding member with a better efficiency. Therefore, it is possible to radiate heat of the image forming device from a portion exposed to the outside in the holding member with a better efficiency.

In the first aspect, it is preferable that the display unit includes a light guide member making the image formed by the image forming device incident on the observer's eyes, that the holding member includes a frame, having at least a portion thereof exposed to the outside, which holds the light guide member at a position corresponding to the observer's eyes, and that the heat conduction member is connected to the frame so as to be capable of heat conduction.

As a place where the frame is disposed, the head (position corresponding to the frontal region and the temporal region) of the observer can be illustrated.

Here, the frame holding the light guide member is a member having a relatively large area of the outer surface thereof because the frame holds the light guide member disposed corresponding to the eyes of the observer in addition to having a tendency to be exposed to the outside.

For this reason, according to such a configuration, it is possible to radiate heat of the image forming device, which is transmitted through the heat conduction member, from the frame having a relatively large area of the outer surface thereof. Thereby, it is possible to radiate heat of the image forming device with a better efficiency.

In the first aspect, it is preferable that the holding member includes a cover member accommodating the image forming device therein and engaging with the frame so that a portion of the frame is disposed therein. It is preferable that the heat conduction member is connected to the image forming device and a portion of the frame within the cover member so as to be capable of heat conduction.

According to such a configuration, since the image forming device and the frame are connected to each other by the heat conduction member within the cover member, the heat conduction member is not exposed to the outside. Accordingly, it is possible to reliably maintain a contact state between the heat conduction member, the image forming device, and the frame. Therefore, it is possible to reliably transmit heat from the image forming device to the frame. In addition, since the movement of the heat conduction member located within the cover member is suppressed, it is possible to reliably suppress a positional shift of the image forming device.

In the first aspect, it is preferable that the display unit includes a light guide member making the image formed by the image forming device incident on the observer's eyes, that the holding member includes a frame that holds the light guide member at a position corresponding to the observer's eyes and a cover member that engages with the frame and accommodates the image forming device therein, and that the heat conduction member is connected to a region on an opposite side to the observer in the cover member.

As the arrangement position of the frame, a position corresponding to the head (frontal region and temporal region) of the observer can be illustrated, as described above. In addition, as the arrangement position of the cover member, a position corresponding to the head (region of a temple in the temporal region) of the observer can be illustrated.

According to such a configuration, the heat conduction member is connected to a region on a side opposite to the observer side in the cover member that accommodates the image forming device therein. Accordingly, it is possible to transmit heat of the image forming device to a region on a side opposite to the observer in the cover member through the heat conduction member. Therefore, it is possible to prevent the observer from feeling heat of the image forming device by the heat being transmitted to the region on the observer side in the cover member.

In the first aspect, it is preferable that the thermal conductivity of the region on a side opposite to the observer in the cover member is higher than a thermal conductivity of a region on the observer side.

According to such a configuration, the thermal conductivity of the region on a side opposite to the observer connected to the heat conduction member in the cover member is higher than the thermal conductivity of the region on the observer side. Accordingly, compared to a case where heat of the image forming device is transmitted by connection to the region on the observer side, it is possible to easily transmit the heat and to easily radiate the heat. Therefore, it is possible to effectively cool the image forming device.

In addition, the thermal conductivity of the region on the observer side is low, and thus it is possible to make the observer less likely to feel the heat of the image forming device.

In the first aspect, it is preferable that a thickness dimension of the region on a side opposite to the observer in the cover member is smaller than a thickness dimension of the region on the observer side.

According to such a configuration, the thickness dimension of the region on the observer side in the cover member is larger than the thickness dimension of the region on a side opposite to the observer, and thus it is possible to make the observer less likely to feel the heat of the image forming device, similar to the thermal conductivity.

In addition, the thickness dimension of the region on a side opposite to the observer in the cover member is smaller than the thickness dimension of the region on observer side, and thus it is possible to reduce the heat resistance of the region on a side opposite to the observer. Thereby, it is possible to easily transmit the heat of the image forming device to the region through the heat conduction member and to easily radiate heat of the image forming device to the outside. Therefore, it is possible to cool the image forming device more effectively.

In the first aspect, it is preferable that the image display device further includes a mounting portion that has a shape conforming to a head of the observer and is mounted on the head of the observer, and a connecting portion that connects the mounting portion and the holding member. It is preferable that the mounting portion has a heat radiation portion radiating heat of the image forming device which is transmitted from the holding member through the connecting portion. It is preferable that the heat radiation portion is provided on an opposite side to the head of the observer in the mounting portion.

As a mounting region of the mounting portion, the frontal region, the temporal region, the occipital region, and the parietal region in the head of the observer can be illustrated. In addition thereto, when the observer is wearing a helmet, a cap, or the like, positions corresponding to the frontal region, temporal region, occipital region, and parietal region in the helmet, the cap, or the like can be illustrated. That is, the mounting portion may be fixed to a position corresponding to the head (specifically, a region above an outer peripheral line of the head which passes through the eyebrows and the ears) of the observer, and a component such as a helmet or a cap may be interposed between the head and the mounting portion. In this manner, the mounting portion is fixed to a region above the forehead of the observer.

According to such a configuration, heat of the image forming device can be transmitted from the holding member through the connecting portion to the mounting portion, and can be radiated from the heat radiation member of the mounting portion which is provided on a side opposite to the head of the observer. Accordingly, it is possible to prevent the observer from feeling the heat of the image forming device by the heat transmitted to a region on the observer side in the mounting portion. In addition, for example, when the observer is wearing a helmet or the like, it is possible to reliably prevent the observer from feeling the heat.

A head mounted image display device according to a second aspect of the invention includes a display unit that displays an image so as to be visually recognized by an observer, a holding member that holds the display unit and has at least a portion thereof exposed to the outside, a mounting member that is connected to the holding member, has a shape conforming to a head of the observer, and is mounted on the head of the observer, and a heat conduction member, having a sheet shape, which is connected to the holding member. The display unit includes an image forming device that forms the image. The heat conduction member comes into contact with the image forming device so as to be capable of heat conduction and transmits heat of the image forming device to the holding member.

According to the second aspect, it is possible to exhibit the same effects as those of the image forming device according to the first aspect.

An image display device according to a third aspect of the invention is an image display device, which is mounted on a head of an observer, and including a heat insulating member that is disposed between a heat generating body constituting the image display device and the observer.

According to the third aspect, it is possible to suppress the transmission or radiation of the heat of the heat generating body to the observer side by the heat insulating member being disposed at the position. For this reason, it is possible to prevent the observer wearing the image display device from feeling the heat of the heat generating body. Therefore, it is possible to improve the feeling of wearing of the image display device.

In the third aspect, it is preferable that the image display device further includes a container that accommodates the heat generating body therein.

According to such a configuration, it is possible to prevent the observer from feeling the heat of the heat generating body due to the radiation of the heat, compared to a case where a container is not provided. Therefore, it is possible to further improve the feeling of wearing of the image display device.

In the third aspect, it is preferable that the heat insulating member is located at a lateral side portion on the observer side in the container.

In this case, the heat insulating member may be located on the outer surface of the lateral side portion, or may be located on the inner surface thereof.

According to such a configuration, it is possible to easily dispose the heat insulating member within the container. Therefore, it is possible to reliably make the heat of the heat generating body less likely to be transmitted to the lateral side portion and to reliably improve the feeling of wearing of the image display device.

In the third aspect, it is preferable that the heat insulating member is disposed between a lateral side portion on the observer side in the container and the heat generating body.

According to such a configuration, when the heat insulating member is connected to the inner surface of the lateral side portion, it is possible to easily dispose the heat insulating member within the container. On the other hand, when a gap or another member is interposed between the heat insulating member and the inner surface of the lateral side portion, it is possible to prevent the heat of the heat generating body which is transmitted to the heat insulating member from being directly transmitted to the lateral side portion.

In the third aspect, it is preferable that the heat insulating member is formed of a heat insulating material filled into the container.

As such a heat insulating material, a foamed heat insulating material, such as high density expanded polyethylene foam, which is capable of being filled into the container, can be illustrated.

According to such a configuration, it is possible to reliably locate the heat insulating member between the heat generating body and the observer side lateral side portion by the heat insulating member filled into the container, and to make the heat of the heat generating body less likely to be transmitted to the observer side lateral side portion. Therefore, it is possible to reliably improve the feeling of wearing of the image display device.

In the third aspect, it is preferable that the heat insulating member is provided so as to surround the heat generating body within the container.

As such a heat insulating member, a sheet-shaped heat insulating material having flexibility can be illustrated.

According to such a configuration, it is possible to reliably locate the heat insulating member between the heat generating body and the observer side lateral side portion by the heat generating body being surrounded by the heat insulating member, similar to a case where the heat insulating member is filled into the container, and to make the heat of the heat generating body less likely to be transmitted to the observer side lateral side portion. Therefore, it is possible to reliably improve the feeling of wearing of the image display device.

In the third aspect, it is preferable that the image display device further includes a heat conduction path that is connected to the heat generating body and transmits the heat of the heat generating body to the outside of the container.

According to such a configuration, the heat of the heat generating body is transmitted to the outside of the container by the heat conduction path, and thus it is possible to suppress a temperature rise within the container. Accordingly, the transmission of the heat of the heat generating body to the observer side lateral side portion can be suppressed, and thus it is possible to more reliably improve the feeling of wearing of the image display device. In addition, when the heat generating body has a characteristic of being vulnerable to heat, it is possible to suppress a temperature rise of the heat generating body and to suppress the deterioration of the heat generating body by transmitting the heat of the heat generating body to the outside of the container.

In the third aspect, it is preferable that the image display device further includes a heat conduction member that comes into contact with the heat generating body and has heat of the heat generating body transmitted thereto, and a frame that supports the container and has heat of the heat generating body transmitted thereto through the heat conduction member. It is preferable that at least a portion of the frame is exposed to the outside and that the heat conduction path is configured to include the heat conduction member and the frame.

According to such a configuration, the heat of the heat generating body is transmitted to the frame of which at least a portion is exposed to the outside, through the heat conduction member. Thereby, it is possible to radiate the heat of the heat generating body to the outside of the image display device. Therefore, it is possible to reliably suppress the transmission of the heat of the heat generating body to the observer side lateral side portion. In addition thereto, it is possible to suppress a temperature rise of the heat generating body and to reliably suppress the deterioration of the heat generating body.

In the third aspect, it is preferable that the container includes a first accommodating portion that is located on the observer side, and a second accommodating portion that is located on an opposite side to the observer side and constitutes the container in combination with the first accommodating portion. It is preferable that the second accommodating portion is integrated with the frame.

According to such a configuration, for example, when heat of the heat generating body is transmitted to one of the frame and the second accommodating portion, the heat is also transmitted to the other, and thus it is possible to increase the area of the heat radiated. In addition, in the container, the first accommodating portion located on the observer side and the second accommodating portion located on a side opposite to the observer side can be configured as separate bodies. For this reason, as shown in the first aspect, it is possible to easily configure the first accommodating portion and the second accommodating portion which differ from each other in thermal conductivity and a thickness dimension.

In the third aspect, it is preferable that the image display device further includes a heat conduction member that comes into contact with the heat generating body and has heat of the heat generating body transmitted thereto. It is preferable that the container has an external lateral side portion which is located on a side opposite to the observer side, that the heat conduction member transmits heat of the heat generating body to the external lateral side portion, and that the heat conduction path is configured to include the heat conduction member and the external lateral side portion.

According to such a configuration, heat of the heat generating body is transmitted to the external lateral side portion located on a side opposite to the observer side, through the heat conduction member. Thereby, the heat of the heat generating body can be radiated to the outside of the image display device, and thus it is possible to suppress the deterioration of the heat generating body. In addition, since the heat of the heat generating body can be made less likely to be transmitted to the lateral side portion located on the observer side, it is possible to further improve the feeling of wearing of the image display device.

In the third aspect, it is preferable that the image display device further includes an image forming device that is disposed within the container and forms an image visually recognized by the observer. It is preferable that the image forming device is included in the heat generating body.

As the image forming device, a combination of a light source device and an optical modulation device modulating light emitted from the light source can be illustrated. In addition thereto, a self-luminous display panel such as an organic electro-luminescence (EL) panel can be illustrated. In addition, as the optical modulation device, not only a liquid crystal panel but also a micro electro mechanical systems (MEMS) device such as a digital mirror device can be illustrated.

Here, when the image display device is used, the image forming device generates a relatively high-temperature heat. On the other hand, heat generated by the image forming device, which is a heat generating body, can be prevented from being transmitted to the lateral side portion on the observer side in the container by the heat insulating member, and thus it is possible to improve the feeling of wearing of the image display device as described above.

In addition, the image forming device has a characteristic of being vulnerable to heat. For this reason, when the image display device has the heat conduction path, the heat of the image forming device can be radiated to the outside, and thus it is possible to suppress a temperature rise and deterioration of the image forming device.

In the third aspect, it is preferable that the image display device further includes an image forming device that is disposed on a side opposite to the observer side within the container, forms an image visually recognized by the observer, and emits the formed image, and a reflection member that is disposed on the observer side within the container and reflects the image emitted from the image forming device. It is preferable that the image forming device is included in the heat generating body.

The image reflected by the reflection member may be directly visually recognized by the eyes of the observer, or may be visually recognized by light (image light) for forming the image being guided to the eyes of the observer by the light guide member. In addition, the image reflected by the reflection member may be emitted to the outside of the container through a lens or the like.

According to such a configuration, the image forming device generating a relatively high-temperature heat during the use of the image display device is disposed on a side opposite to the observer side with respect to the reflection member within the container, and thus it is possible to increase a dimension between the image forming device and the lateral side portion on the observer side. In addition, the reflection member located between the image forming device and the lateral side portion can be used as an obstacle that blocks the transmission of heat generated by the image forming device to the lateral side portion. Therefore, it is possible to reliably suppress the transmission of the heat of the image forming device to the lateral side portion and to further reliably improve the feeling of wearing of the image display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the accompanying drawings.
Schematic Configuration of Virtual Image Display Device FIG. 1 is a perspective view illustrating a state where a virtual image display device 1 according to the present embodiment is mounted on an observer US.

Figure 1:
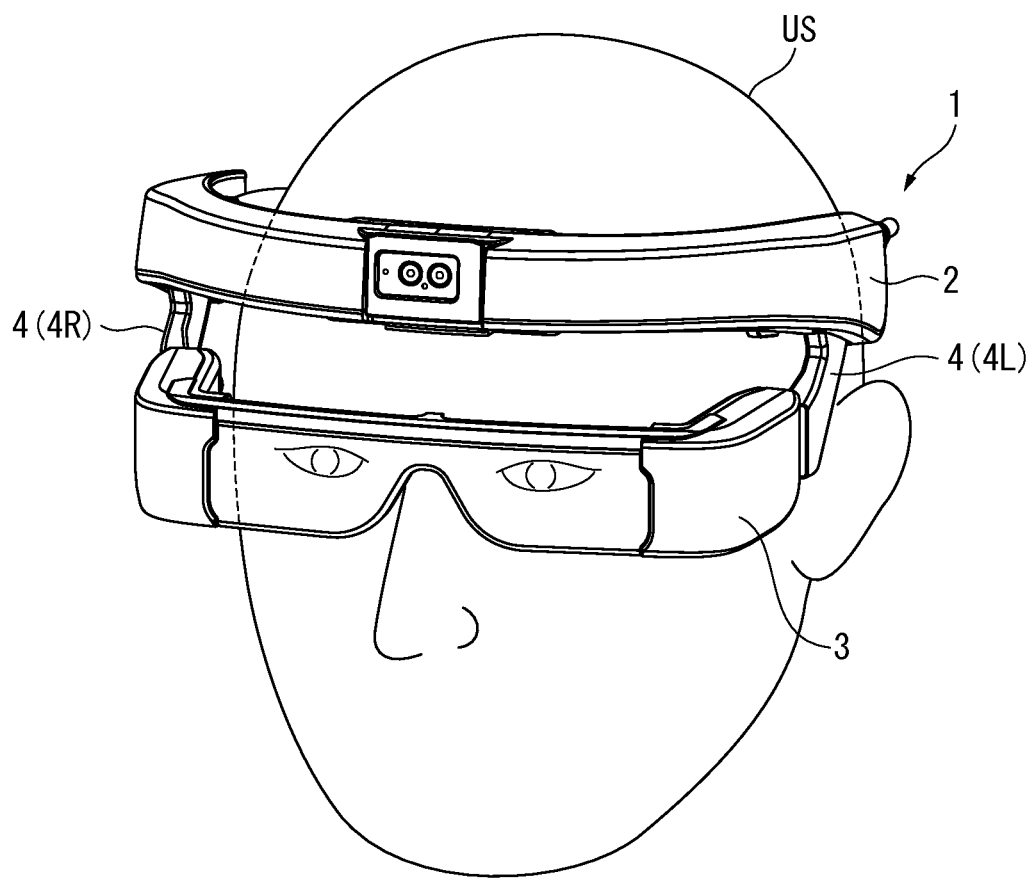
FIG. 1 is a perspective view illustrating a virtual image display device according to a first embodiment of the invention.

The virtual image display device 1 according to the present embodiment is a head mounted display (HMD) which is used by being mounted on the head of the observer US or a mounting region (that is, a region located above an outer peripheral line connecting the frontal region and the temporal region in the head) such as a helmet, as illustrated in FIG. 1. The virtual image display device 1 is equivalent to an image display device and a head mounted image display device according to the invention, and is a see-through type HMD that displays a virtual image so as to be capable of being visually recognized by the observer US and enables the outside world to be observed by transmitting outside light.

Figure 2:
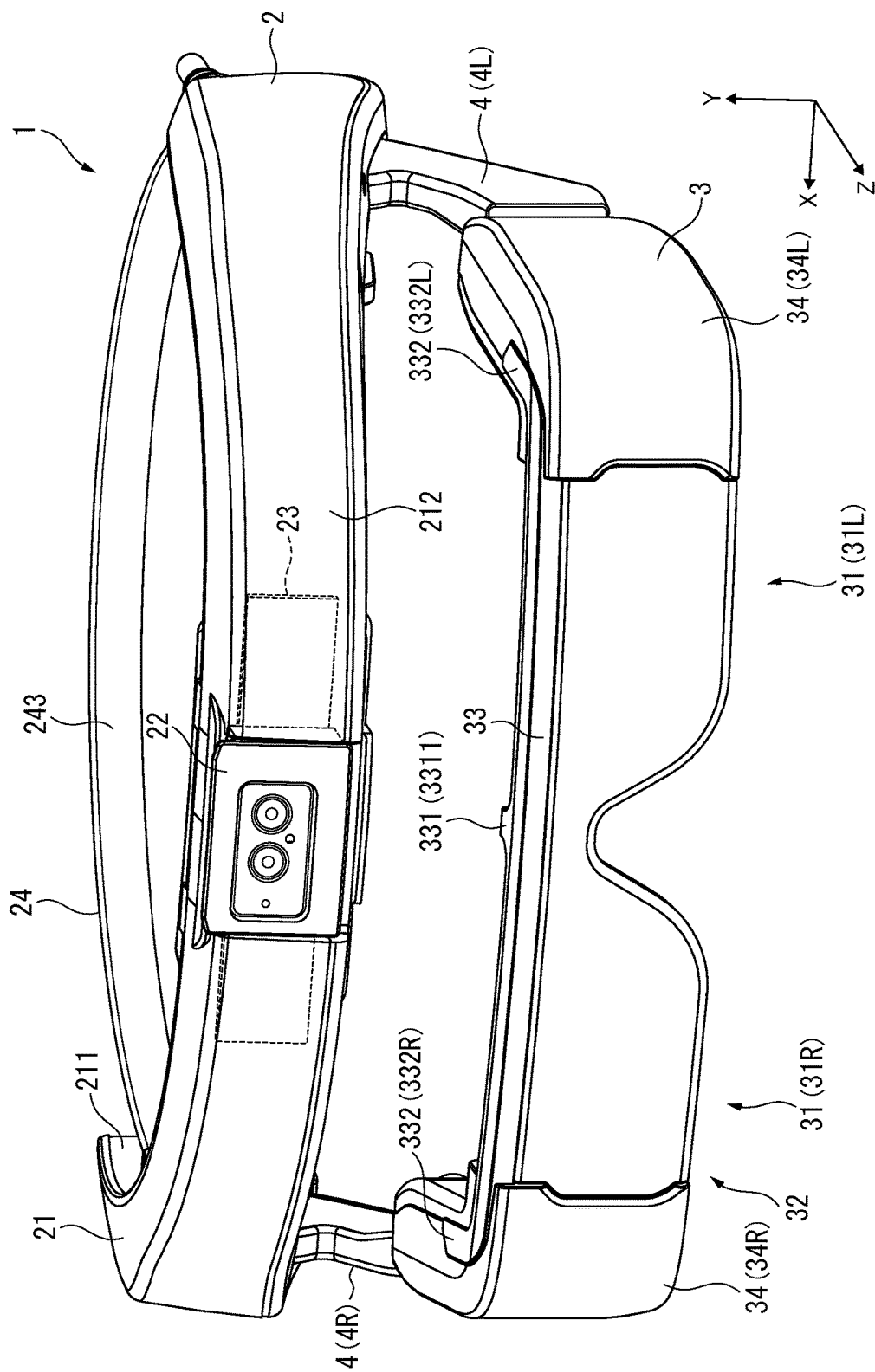
FIG. 2 is a perspective view illustrating the virtual image display device according to the first embodiment.
Figure 3:
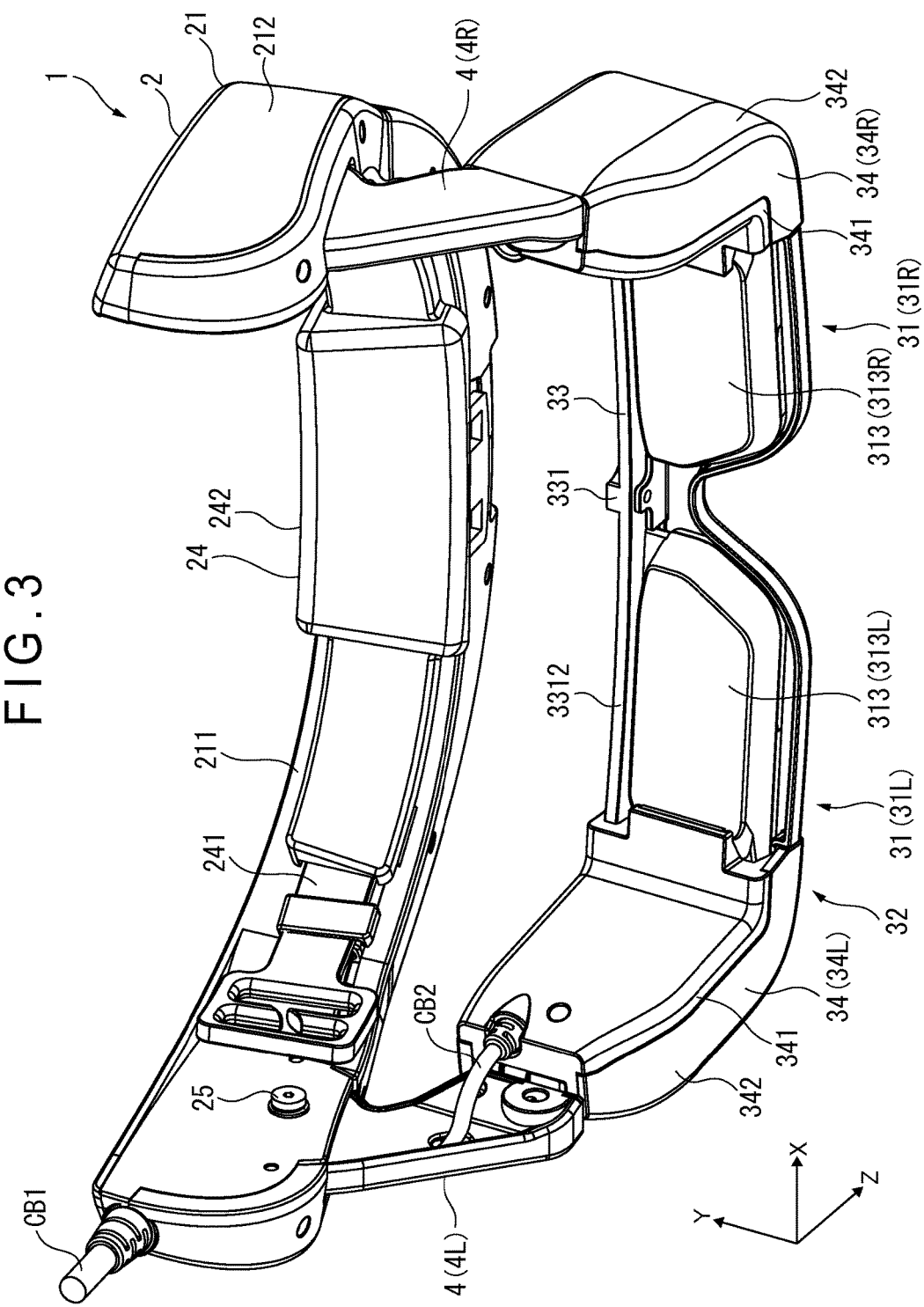
FIG. 3 is a perspective view illustrating the virtual image display device according to the first embodiment.

FIGS. 2 and 3 are perspective views when the virtual image display device 1 is seen from the front side and the back side. In other words, FIG. 2 is a perspective view when the virtual image display device 1 is seen from the opposite side to the observer US side, and FIG. 3 is a perspective view when the device is seen from the observer US side.

As illustrated in FIGS. 1 to 3, the virtual image display device 1 includes a head band portion 2 which is mounted on the mounting region, a display unit 3 that displays an image, and a pair of arm portions 4 (4L, 4R) which are rotatably attached to the head band portion 2 and connect the head band portion 2 and the display unit 3.

Meanwhile, in the following description, a Z-direction is a visual direction when the observer US wearing the virtual image display device 1 faces the front, and an X-direction and a Y-direction are directions which are orthogonal to the Z-direction and are orthogonal to each other. Among these directions, the X-direction is a direction from the left to the right when seen from the observer US wearing the virtual image display device 1, and the Y-direction is an upward direction when seen from the observer US. Further, the Z-direction side indicates a downstream side (Z-direction tip side) in the Z-direction, and the opposite side to the Z-direction indicates an upstream side (Z-direction base side) in the Z-direction. The same is true of other directions.

In addition, in the present embodiment, the head band portion 2 is described as being mounted on the head of the observer US. That is, the mounting region of the virtual image display device 1 is the head of the observer US in the present embodiment, and is specifically the upper portion of the head including the frontal region and the temporal region. However, as described above, the head band portion 2 is also able to be mounted on a helmet, a cap or the like mounted on the head of the observer US.
Configuration of Head Band Portion As illustrated in FIGS. 2 and 3, the head band portion 2 includes an exterior case 21 constituting an exterior, an imaging unit 22, a control unit 23, a mounting member 24, and a rotating shaft portion 25. The head band portion 2 is equivalent to a mounting portion according to the invention.

Among these, the mounting member 24 includes a band 241 which is attached to the exterior case 21, an abutting member 242 that abuts on a mounting region, and a band member 243 which is fixed to the band 241.

As illustrated in FIGS. 2 and 3, the exterior case 21 is disposed along the frontal region and the temporal region of the observer US which are included in the mounting region of the virtual image display device 1, and is fixed to the mounting region by the mounting member 24. The exterior case 21, accommodating the control unit 23 therein, cables CB1 and CB2 connected to the control unit 23, and the like, is a housing that supports the imaging unit 22 and the arm portions 4 (4L, 4R).

The exterior case 21 has an exterior having a substantially semicircular shape (substantially U-shape) corresponding to the shapes of the frontal region and the temporal region of the observer US. That is, in the exterior case 21, an internal lateral side portion 211 facing the frontal region and the temporal region of the observer US is curved along the head of the observer US when seen from the Y-direction side.

An end of each of the arm portions 4 is rotatably supported by the rotating shaft portion 25 in the vicinity of both arc-shaped ends of the exterior case 21. Thereby, the arm portions 4L and 4R are configured to be rotatable about a region to be connected to the head band portion 2.

As illustrated in FIG. 2, the imaging unit 22 is disposed at substantially the center of an external lateral side portion 212, in the X-direction, which is located on a side opposite to the internal lateral side portion 211 in the exterior case 21, and captures an image of the surroundings in front of the observer US, that is, a portion of region in the visual field of the observer US. The imaging unit 22 is rotatably attached to the exterior case 21 about a rotating shaft along the X-direction, and is configured to be able to change an imaging direction.

The control unit 23, configured as a circuit board having a processing circuit mounted thereon, controls the imaging unit 22 and outputs a captured image captured by the imaging unit 22 to the outside through the cable CB1 as illustrated in FIG. 2. In addition, the control unit 23 receives image information through the cable CB1 and outputs the received information to the display unit 3 through the cable CB2 to thereby control the display unit 3.

Meanwhile, although not shown in the drawing, the head band portion 2 is connected to a controller that receives various types of input operations by the observer US, and operation information and image information are transmitted to the control unit 23 through the cable CB1 from the controller.

Configuration of Arm Portion

As illustrated in FIGS. 2 and 3, the pair of arm portions 4 (the arm portion located on the left side in the observer US is set to be 4L, and the arm portion located on the right side is set to be 4R) connect the exterior case 21 of the head band portion 2 and cover members 34L and 34R of the display unit 3, respectively, and are rotatably supported with respect to the exterior case 21. The arm portions 4L and 4R are equivalent to connecting portions according to the invention, and are connected to the corresponding cover members 34L and 34R in the display unit 3.

Meanwhile, although not shown in the drawing, the virtual image display device 1 includes a movement mechanism that relatively moves the display unit 3 with respect to the arm portions 4 so that the display unit 3 is attachable and detachable to and from the head band portion 2. The movement mechanism includes, for example, a slide member provided in the display unit 3 and a gripping member that is provided in the arm portion 4 and grips the slide member. A distance between the head band portion 2 and the display unit 3 can be adjusted by moving the display unit 3 with respect to the arm portions 4 while sliding the slide member in a state of being gripped by the gripping member.

Configuration of Display Unit

The display unit 3 forms an image corresponding to image information which is input from the control unit 23, and causes the observer US to visually recognize the image as a virtual image. As illustrated in FIGS. 2 and 3, the display unit 3 includes a pair of optical devices 31 (31L, 31R) which are respectively disposed on the right side and the left side for the observer US, a holding member 32 that holds the pair of optical devices 31 (31L, 31R), and a heat conduction member 5 (see FIG. 5). Meanwhile, the left optical device 31L and the right optical device 31R have a relationship in which the devices are mirror-symmetrical with respect to each other.

Configuration of Optical Device

Figure 4:
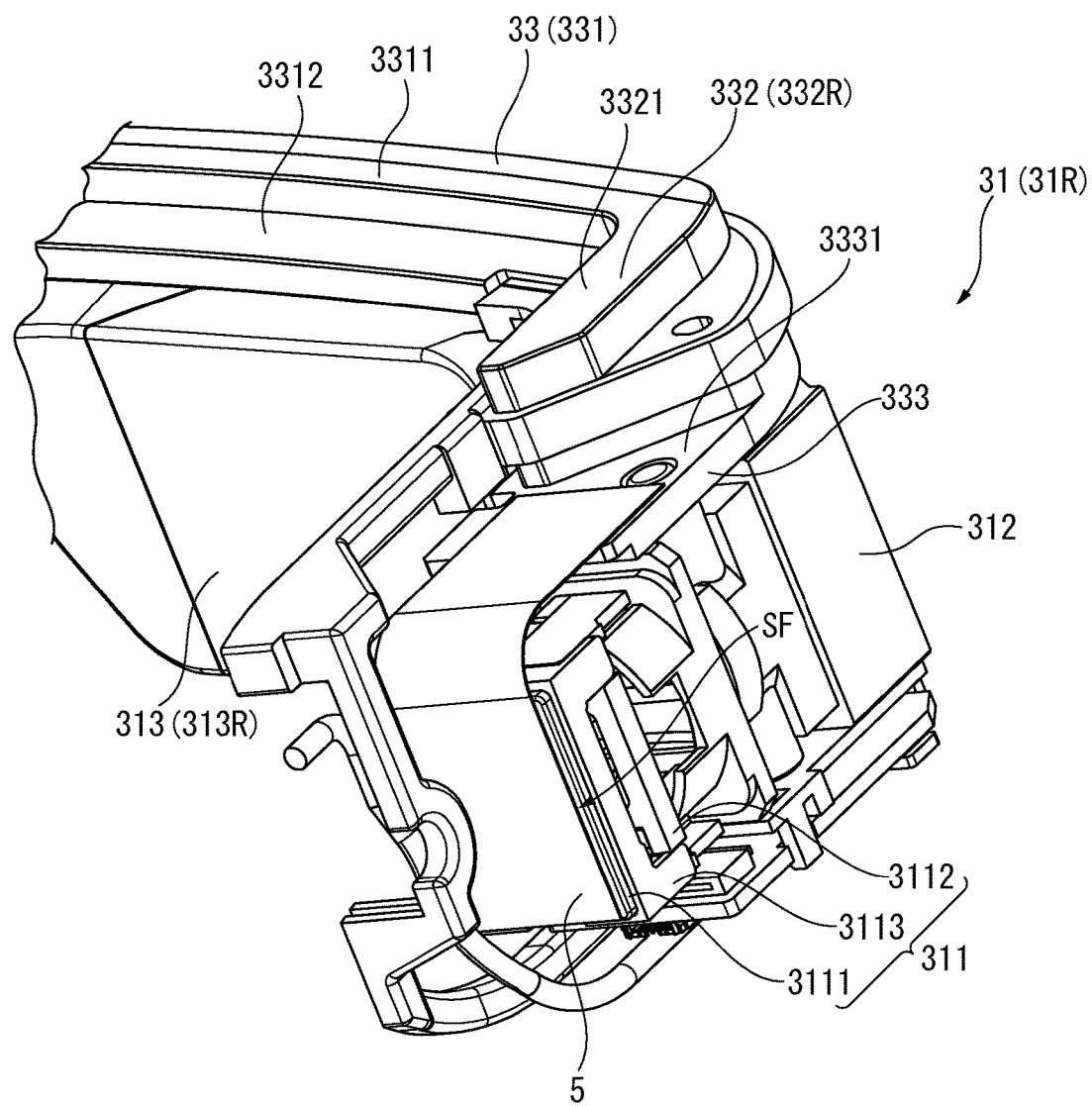
FIG. 4 is an enlarged perspective view illustrating a display unit included in the virtual image display device according to the first embodiment.
Figure 5:
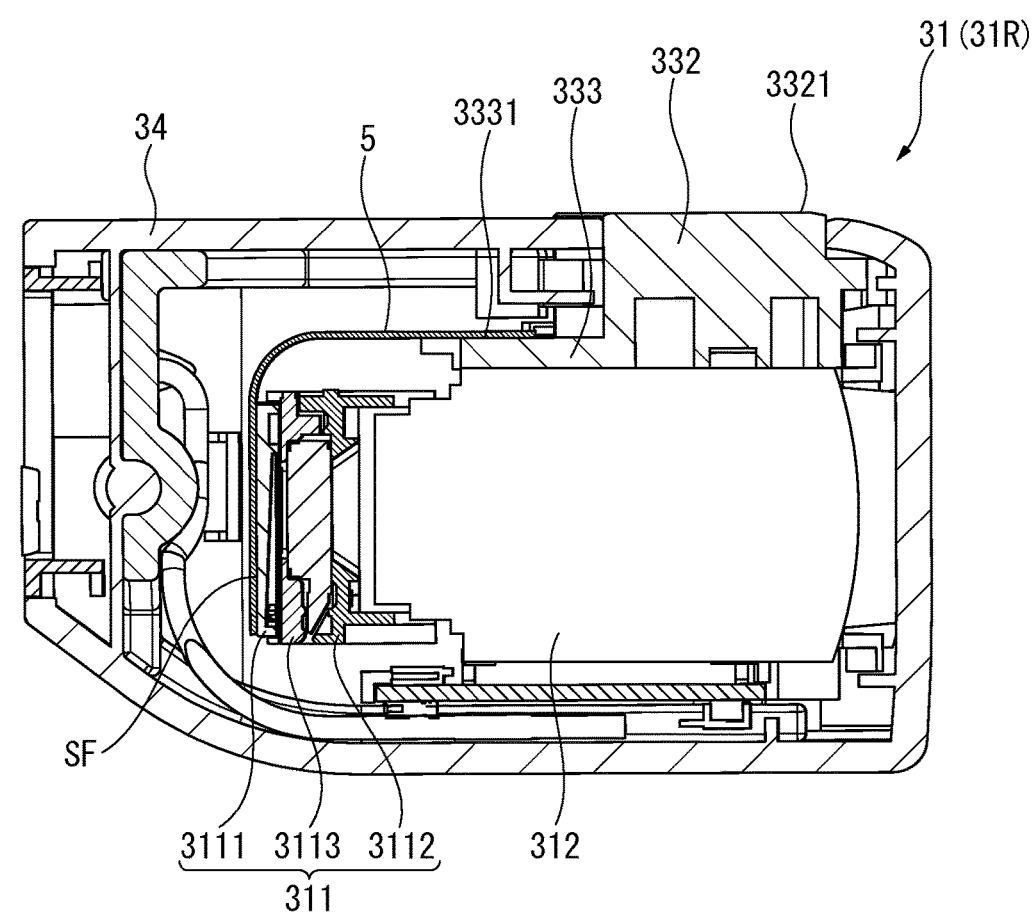
FIG. 5 is a cross-sectional view illustrating a right optical device included in the display unit of the virtual image display device according to the first embodiment.

FIG. 4 is a diagram illustrating the inside of the right optical device 31R except for a portion of the cover member 34 constituting the holding member 32, and FIG. 5 is a diagram illustrating the cross section of the right optical device 31R along a YZ plane when seen from the X-direction side.

In the pair of optical devices 31, the right optical device 31R includes an image forming device 311, a projection lens 312, and a light guide member 313 (see FIG. 3) as illustrated in FIGS. 4 and 5.

The image forming device 311 includes a light source device 3111, an optical modulation device 3112, and a fixation member 3113.

The light source device 3111 includes a substrate having an LED mounted thereon, and is disposed on a side most opposite to the Z-direction in the configuration of the right optical device 31R.

The optical modulation device 3112, disposed on the Z-direction side with respect to the light source device 3111, modulates light incident from the light source device 3111 to form an image corresponding to the image information. The optical modulation device 3112 is constituted by a transmissive liquid crystal panel in the present embodiment.

The fixation member 3113 integrates the light source device 3111 with the optical modulation device 3112 with each other. The fixation member 3113 is formed of a thermal conductive metal. For this reason, heat of the optical modulation device 3112 is transferred to the fixation member 3113.

The projection lens 312 is a projection optical device which is disposed on the Z-direction side with respect to the optical modulation device 3112 and projects light (image light) projected by the optical modulation device 3112 onto the light guide member 313. Although not shown in the drawing, the projection lens 312 includes a plurality of lens and a body tube that accommodates the plurality of lenses therein. Meanwhile, a prism that guides image light incident from the image forming device 311 to the light guide member 313 may be adopted instead of the projection lens 312.

The light guide member 313 (313R) is disposed at a position corresponding to the eyes of the observer US, and image light projected by the projection lens 312 is incident on the light guide member. The light guide member 313 has a semi-transmissive layer (semi-reflective layer) formed therein, and is configured to be able to observe the outside world through the semi-transmissive layer. In addition thereto, the light guide member is configured such that image light emitted from the projection lens 312 and reflected by the semi-transmissive layer, is incident on the eyes, whereby a virtual image corresponding to the image light is visually recognized. The light guide member 313 is mainly formed of a resin (for example, cycloolefin polymer) showing high light-transmissive properties in a visible light region.

Meanwhile, although not shown in the drawing, similar to the right optical device 31R, the left optical device 31L includes the image forming device 311, the projection lens 312, and the light guide member 313 (313L) which are disposed along the Z-direction.

Configuration of Holding Member

The holding member 32 holds the pair of optical devices 31 (31L, 31R) and is connected to the arm portions 4. As illustrated in FIG. 2, the holding member 32 includes a frame 33 and the cover members 34 (34L, 34R).

The frame 33 holds an end of each of the light guide members 313 (313L, 313R) on the Y-direction side. The frame 33 is formed in a substantially U-shape along the head (frontal region and temporal region) of the observer US when seen from the Y-direction side and is disposed at a position corresponding to the head, and thus the light guide members 313 held by the frame 33 are respectively disposed at positions corresponding to the eyes of the observer US. In the present embodiment, the frame 33 is formed by aluminum die-casting or formed of any of various types of metals, and has thermal conductivity.

The frame 33 includes a central portion 331 that holds the light guide member 313, and ends 332 (332L, 332R) which extend to the observer side (opposite side to the Z-direction) from both ends of the central portion 331.

An upper surface 3311 which is a surface of the central portion 331 on the Y-direction side has irregularities formed thereon, in addition to being exposed to the outside. Specifically, a concave portion 3312 is formed in a region of the upper surface 3311 on the X-direction side and a region on a side opposite to the X-direction, thereby increasing the surface area thereof.

In the frame 33, the right end 332R is provided with a protrusion portion 333 that protrudes further toward the opposite side to the Z-direction than an upper surface 3321 of the end 332R from a position on a side opposite to the Y-direction, as illustrated in FIG. 4. The end 332R is disposed within the cover member 34R to be described later in a state where only the upper surface 3321 is exposed to the outside, and the protrusion portion 333 is disposed within the cover member 34R.

Meanwhile, the heat conduction member 5 to be described later is connected to an upper surface 3331 which is located on the Y-direction side and is formed in a planar shape in the protrusion portion 333.

In addition, although not shown in the drawing, the left end 332L is also provided with a protrusion portion which is the same as that of the protrusion portion 333. The end 332L is disposed within the cover member 34L to be described later in a state where only an upper surface of the end 332L is exposed to the outside, and the protrusion portion of the end 332L is disposed within the cover member 34L.

Each of the cover members 34 (34L, 34R) is formed of a synthetic resin. Among these members, the cover member 34R accommodates the image forming device 311 and the projection lens 312 which constitute the right optical device 31R, the heat conduction member 5, and the protrusion portion 333 of the end 332R. In addition, the cover member 34L accommodates the image forming device 311 and the projection lens 312 which constitute the left optical device 31L, the heat conduction member 5, and the protrusion portion of the end 332L. Each of the cover members 34L and 34R is fixed to the frame 33, and thus is disposed at a position corresponding to the head (region of a temple in the temporal region) of the observer US.

As illustrated in FIG. 3, each of the cover members 34L and 34R includes a first cover member 341 that constitutes an observer side lateral side portion disposed on the observer side, and a second cover member 342 that constitutes an external lateral side portion disposed on a side opposite to the observer. The first cover members 341 and the second cover members 342 are combined with each other so as to interpose the corresponding optical devices 31L and 31R therebetween, thereby constituting the cover members 34L and 34R.

Configuration of Heat Conduction Member

The heat conduction member 5, provided within each of the cover members 34L and 34R, transmits heat of the image forming device 311 constituting each of the optical devices 31L and 31R to the frame 33, and is constituted by a rectangular graphite sheet having flexibility in the present embodiment.

Among the heat conduction members 5, the heat conduction member 5 provided within the cover member 34R connects the image forming device 311 and the protrusion portion 333 of the end 332R so as to be capable of heat conduction therebetween, as illustrated in FIGS. 4 and 5. Specifically, an end of the heat conduction member 5 is connected to a surface SF and the fixation member 3113 in the light source device 3111 of the image forming device 311 on a side opposite to the Z-direction. In addition, the other end of the heat conduction member 5 is connected to the upper surface 3331 in the protrusion portion 333. In this manner, the heat conduction member 5 is provided at a positon where a light path of light (image light) emitted from the image forming device 311 is not blocked.

More specifically, the heat conduction member 5 comes into surface contact with the image forming device 311 so as to be capable of heat conduction, and comes into surface contact with the upper surface 3331 so as to be capable of heat conduction. Thereby, heat of the image forming device 311 (light source device 3111 and optical modulation device 3112) is transmitted to the frame 33 through the heat conduction member 5. That is, heat of the light source device 3111 is directly transmitted to the heat conduction member 5, and furthermore, heat of the optical modulation device 3112 is transmitted to the heat conduction member 5 through the fixation member 3113. The heat transmitted to the heat conduction member 5 is transmitted to the frame 33 through the protrusion portion 333, and is radiated at the upper surface 3311.

Meanwhile, although not shown in the drawing, regarding the heat conduction member 5 provided within the cover member 34L, one end is connected to the image forming device 311 constituting the left optical device 31L so as to be capable of heat conduction, and the other end thereof is connected to the protrusion portion of the end 332L so as to be capable of heat conduction, as described above. Heat generated by the image forming device 311 is transmitted to the protrusion portion through the heat conduction member 5, and is radiated at the frame 33 (specifically, the upper surface 3311).

Effects of First Embodiment

As described above, according to the virtual image display device 1 of the present embodiment, the following effects are exhibited.

Since the heat conduction member 5 is formed in a sheet shape, it is possible to increase the contact area between the image forming device 311 and the frame 33 compared to a case where a heat conduction member constituted by a shielding wire is adopted, and to transmit heat from the image forming device 311 to the frame 33 with a good efficiency. In addition, since a portion of the frame 33, having heat of the image forming device 311 transmitted thereto, is exposed to the outside, it is possible to radiate the transmitted heat at the portion exposed to the outside. Therefore, it is possible to effectively cool the image forming device 311.

In addition, it is possible to make the stress of the heat conduction member 5 less likely to be applied to the image forming device 311 by adopting the heat conduction member 5 having a sheet shape, compared to a case where a heat conduction member constituted by a shielding wire is adopted. Therefore, it is possible to reduce the possibility of the position of the image forming device 311 being shifted and to suppress the shift of an image emitted from the image forming device 311.

Since the light source device 3111 and the optical modulation device 3112 are integrated with each other by the fixation member 3113, it is possible to transmit heat generated by each of the devices to the frame 33 even when the heat conduction member 5 is connected to either of the devices. Therefore, it is possible to effectively cool the light source device 3111 and the optical modulation device 3112.

In addition, since the light source device 3111 and the optical modulation device 3112 which constitute the image forming device 311 are integrated with each other by the fixation member 3113, it is possible to increase the weight of a connection destination of the heat conduction member, compared to a case where the heat conduction member 5 is connected to either the light source device 3111 or the optical modulation device 3112. Accordingly, even when the stress of the heat conduction member 5 is applied to the image forming device 311, it is possible to further reduce the possibility of the positions of the light source device 3111 and the optical modulation device 3112 being shifted. Thereby, it is possible to reliably suppress the shift of an image emitted from the image forming device 311.

The heat conduction member 5 does not block a light path of light emitted from the image forming device 311, and thus an image to be formed can be made to be reliably visually recognized. In addition, since the heat conduction member 5 can be connected to the entire surface at a position where the light path of the light is not blocked, it is possible to increase the contact area between the image forming device 311 and the heat conduction member 5, thereby allowing heat of the image forming device 311 to be transmitted to the frame 33 with better efficiency. Therefore, it is possible to radiate heat of the image forming device 311 from the central portion 331 exposed to the outside in the frame 33 with better efficiency.

The frame 33 holding the light guide member 313 is a member having a relatively large area of the outer surface thereof because the frame holds the light guide member 313 disposed corresponding to the eyes of the observer US, in addition to having a tendency to be exposed to the outside. For this reason, it is possible to radiate heat of the image forming device 311, which is transmitted through the heat conduction member 5, from the frame 33 having a relatively large area of the outer surface thereof. Thereby, it is possible to radiate heat of the image forming device 311 with better efficiency.

Since the image forming device 311 and the frame 33 are connected to each other by the heat conduction member 5 within the cover member 34, the heat conduction member 5 is not exposed to the outside. Accordingly, it is possible to reliably maintain a contact state between the heat conduction member 5, the image forming device 311, and the frame 33. Therefore, it is possible to reliably transmit heat from the image forming device 311 to the frame 33 and to reliably radiate heat of the image forming device 311 to the outside. In addition, since the movement of the heat conduction member 5 located within the cover member 34 is suppressed, it is possible to reliably suppress a positional shift of the image forming device 311.

Second Embodiment

Next, a second embodiment of the invention will be described.

A virtual image display device according to the present embodiment and the virtual image display device 1 have the same configuration, but differ from each other in a connection destination of a heat conduction member 5. That is, the heat conduction member 5 is described as being connected to the frame 33 in the first embodiment, but the heat conduction member 5 according to the present embodiment is connected to a cover member. In addition, the shape and material of the cover member are different from those of the cover member 34. In these regards, the virtual image display device according to the present embodiment is different from the virtual image display device 1. Meanwhile, in the following description, the same or substantially the same components as those described above are denoted by the same reference numerals and signs, and a description thereof will be omitted.

Figure 6:
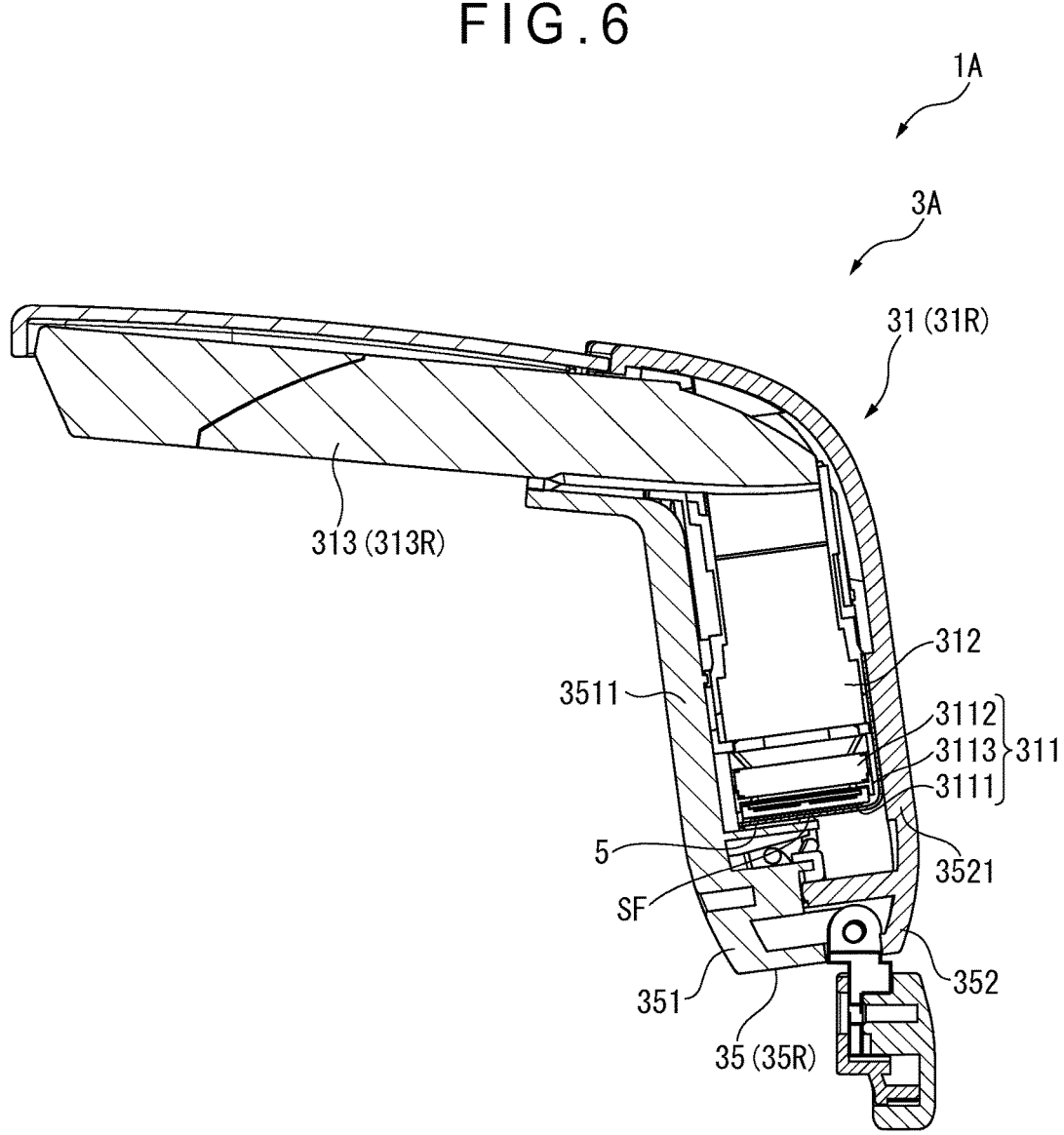
FIG. 6 is a cross-sectional view illustrating a right optical device included in a display unit of a virtual image display device according to a second embodiment of the invention.

FIG. 6 is a diagram when the cross section in an XZ plane of a right optical device 31R of a display unit 3A included in a virtual image display device 1A according to the second embodiment of the invention is seen from the Y-direction side.

The virtual image display device 1A according to the present embodiment has the same configuration and function as those of the virtual image display device 1 except that the device according to the present embodiment includes a display unit 3A instead of the display unit 3. In addition, as illustrated in FIG. 6, the display unit 3A includes a cover member 35 instead of the cover member 34, and has the same configuration and function as those of the display unit 3 except that a connection destination of the heat conduction member 5 is different from that in the previous embodiment.

The cover member 35 constitutes a holding member according to the invention together with a frame 33, and includes a first cover member 351 and a second cover member 352.

The first cover member 351 is located on an observer US side, and is formed of a synthetic resin. On the other hand, the second cover member 352 is located on a side opposite to the observer US, and is formed of a synthetic resin (for example, a filler material) having a thermal conductivity higher than that of the first cover member 351. That is, the thermal conductivity of the first cover member 351 located on the observer US side is lower than the thermal conductivity of the second cover member 352 located on a side opposite to the observer US.

In addition, the thickness dimension (dimension along the X-direction) of a side portion 3511 (side portion 3511 on the observer US side) which faces the observer US in the first cover member 351 is set to be larger than the thickness dimension of a side portion 3521 on a side opposite to the observer US in the second cover member 352. Thereby, for example, even when the same amount of heat is transmitted to the first cover member 351 and the second cover member 352, the temperature of a surface on the observer US side of the first cover member 351 located on the observer US side rises less than the temperature of a surface of the second cover member 352 on a side opposite to the observer US.

The heat conduction member 5 transmits heat of the image forming device 311 to the second cover member 352. Specifically, as illustrated in FIG. 6, the heat conduction member 5 is connected to an image forming device 311 (light source device 3111 and fixation member 3113) and the inner surface of the second cover member 352 within the cover member 35 so as to be capable of heat conduction.

Figure 7:
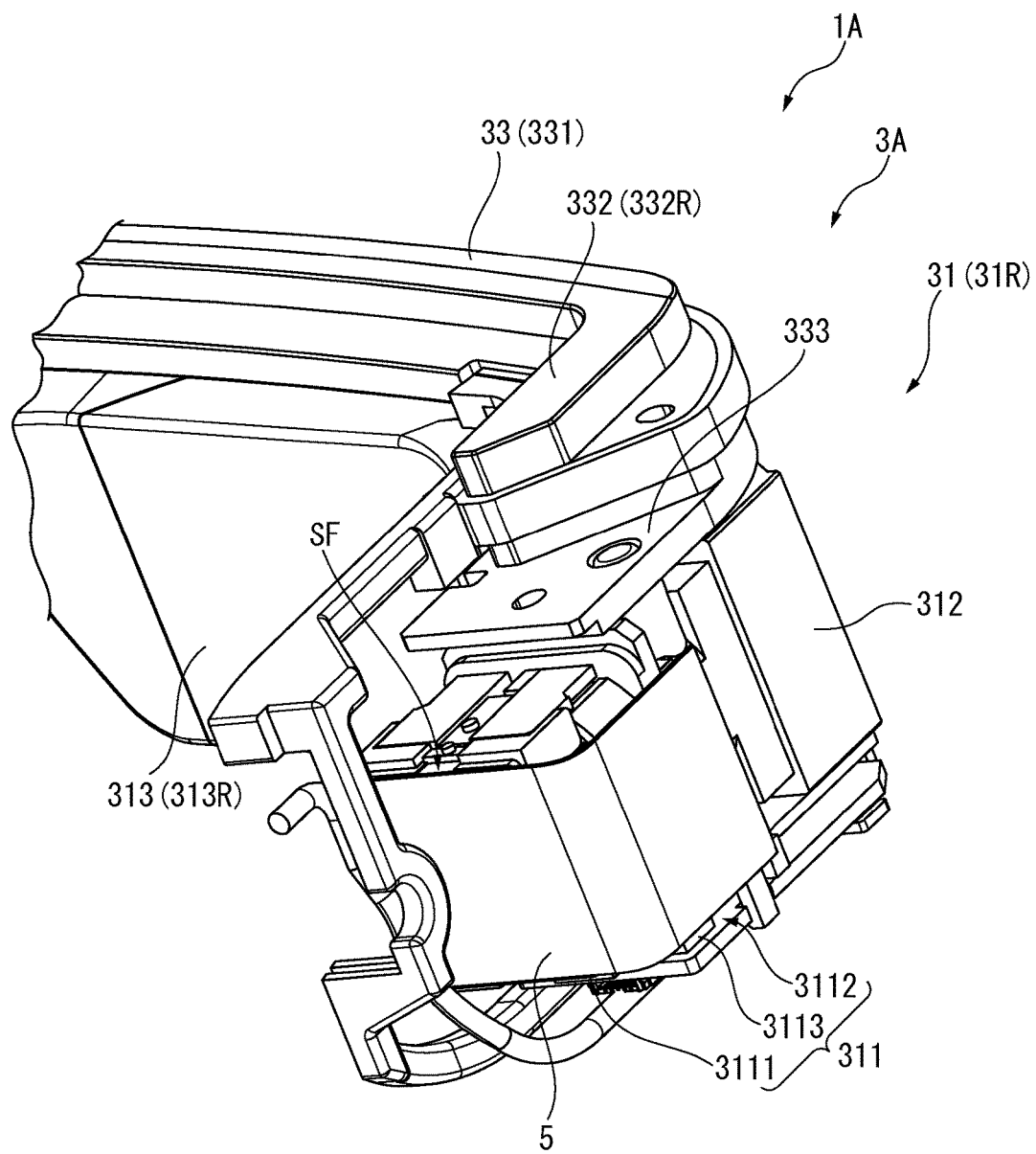
FIG. 7 is an enlarged perspective view illustrating a display unit included in the virtual image display device according to the second embodiment.

FIG. 7 is a perspective view illustrating the heat conduction member 5 connected to the image forming device 311 of the right optical device 31R. Meanwhile, in FIG. 7, for convenience of description, the cover member 35 is not shown.

Specifically, as illustrated in FIGS. 6 and 7, the heat conduction member 5 is disposed within the cover member 35 so as to be bent in substantially an L-shape. An end of the heat conduction member 5 comes into surface contact with a surface SF on a side opposite to the Z-direction in the light source device 3111 of the image forming device 311. Further, the heat conduction member 5 is also connected to the lateral side (lateral side on a side opposite to the observer US side, and is a lateral side on the X-direction side) of the fixation member 3113. On the other hand, the other end of the heat conduction member 5 comes into surface contact with a surface (inner surface) on the observer US side in a side portion 3521 of the second cover member 352. That is, the heat conduction member 5 is connected to the inner surface of the second cover member 352 at a region on a side opposite to a region coming into contact with the lateral side of the fixation member 3113. In this manner, also in the present embodiment, the heat conduction member 5 is connected to a position where a light path of light (image light) emitted from the image forming device 311 is not blocked.

Thereby, heat of the image forming device 311 (light source device 3111 and optical modulation device 3112) of the right optical device 31R is transmitted to the second cover member 352 through the heat conduction member 5 with a good efficiency. That is, the heat of the light source device 3111 is directly transmitted to the heat conduction member 5, and the heat of the optical modulation device 3112 is transmitted to the heat conduction member 5 through the fixation member 3113. The heat transmitted to the heat conduction member 5 is transmitted to the second cover member 352, and is radiated to the outside at a surface on a side opposite to the observer US side in the second cover member 352.

Meanwhile, although not shown in the drawing, the heat conduction member 5 connected to the image forming device 311 of the left optical device 31L constituting the display unit 3A is also connected to the image forming device 311 and the inner surface of the second cover member 352, located on a side opposite to the observer US, within the cover member 35 that accommodates the image forming device 311 therein so as to be capable of heat conduction, as described above. Thereby, the heat of the image forming device 311 is transmitted to the second cover member 352 through the heat conduction member 5, and is radiated to the outside at a surface (outer surface) on a side opposite to the observer US in the second cover member 352.

Meanwhile, a region on a side opposite to the image forming device 311 side in the heat conduction member 5 may be connected not only to the second cover member 352 but also to the frame 33. In this case, it is possible to increase a heat conduction path through which the heat of the image forming device 311 is transmitted.

Effects of Second Embodiment

As described above, according to the virtual image display device 1A of the present embodiment, the following effects are exhibited, in addition to exhibiting the same effects as those of the virtual image display device 1 according to the first embodiment.

The other end of the heat conduction member 5 having one end connected to the image forming device 311 is connected to the second cover member 352 constituting a region on a side opposite to the observer US side in the cover member 35 that accommodates the image forming device 311 and a projection lens 312 therein. Accordingly, it is possible to transmit heat of the image forming device 311 to the second cover member 352 on a side opposite to the observer US in the cover member 35 through the heat conduction member 5. Therefore, it is possible to prevent the observer US from feeling heat of the image forming device 311 by the heat being transmitted to the first cover member 351 constituting a region on the observer US side in the cover member 35, thereby allowing the feeling of wearing of the virtual image display device 1A to be improved.

In the cover member 35, the thermal conductivity of the second cover member 352, having the other end of the heat conduction member 5 connected thereto, which is located on a side opposite to the observer US is higher than the thermal conductivity of the first cover member 351 located on the observer US side. Accordingly, compared to a case where heat of the image forming device 311 is transmitted by the other end side being connected to the first cover member 351, it is possible to easily transmit the heat and to easily radiate the heat. Therefore, it is possible to effectively cool the image forming device 311.

In addition, the thermal conductivity of the first cover member 351 on the observer US side is low, and thus it is possible to suppress a temperature rise of the first cover member 351 and to make the observer US less likely to feel the heat of the image forming device 311.

The thickness dimension of the side portion 3511 of the first cover member 351 located on the observer US side is larger than the thickness dimension of the side portion 3521 of the second cover member 352 located on a side opposite to the observer US. Accordingly, it is possible to make the heat capacity of the first cover member 351 larger than the heat capacity of the second cover member 352, and thus it is possible to suppress a temperature rise of the first cover member 351 and to make the observer US less likely to feel the heat of the image forming device 311. On the other hand, heat resistance becomes smaller due to a decrease in the heat capacity of the second cover member 352, and thus it is possible to easily transmit heat of the image forming device 311 to the second cover member 352 through the heat conduction member 5 and to easily radiate heat of the image forming device 311 to the outside. Therefore, it is possible to cool the image forming device 311 more effectively.

Third Embodiment

Next, a third embodiment of the invention will be described.

A virtual image display device according to the present embodiment includes a heat conduction member 5 that connects an image forming device 311 and a head band portion 2 through an arm portion 4, and a heat radiation member which is provided on a surface on a side opposite to the observer US side in the head band portion 2, in addition to having the same configurations as those of the virtual image display devices 1 and 1A. In this regard, the virtual image display device according to the present embodiment is different from the virtual image display devices 1 and 1A. Meanwhile, in the following description, the same or substantially the same components as those described above are denoted by the same reference numerals and signs, and a description thereof will be omitted.

Figure 8:
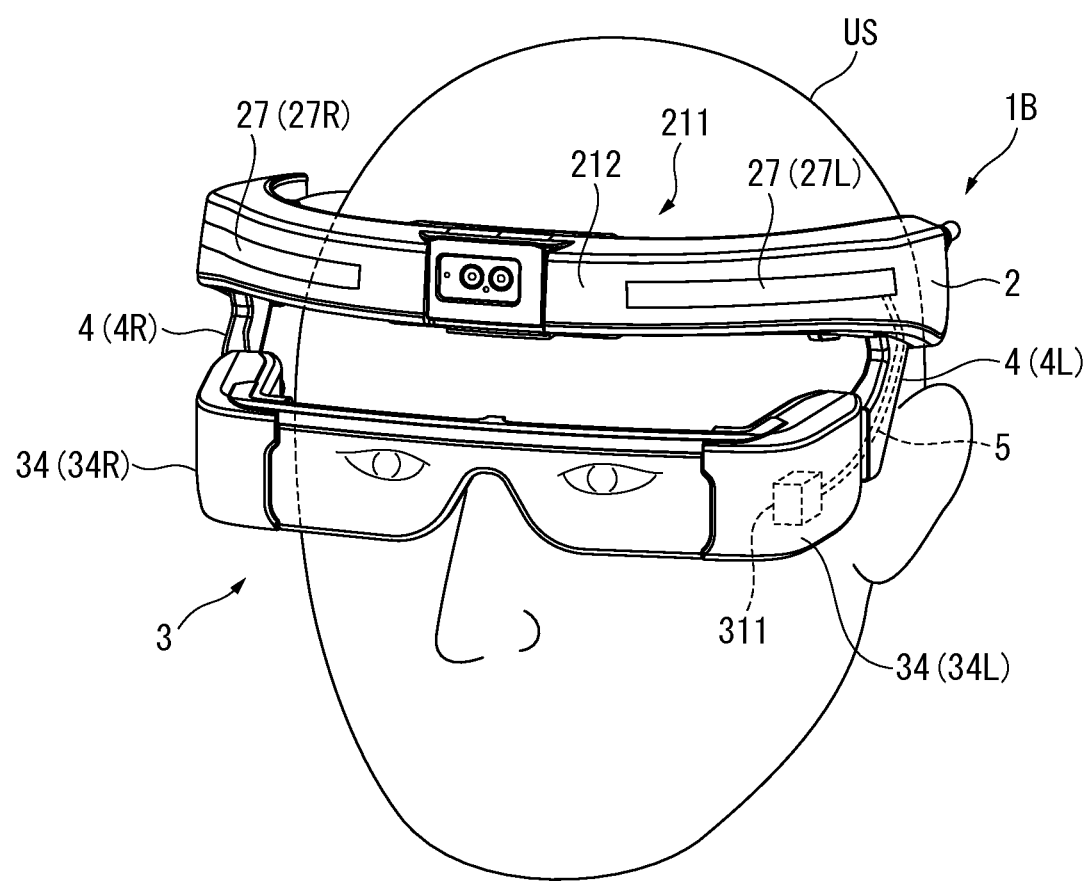
FIG. 8 is a perspective view illustrating a virtual image display device according to a third embodiment of the invention.

FIG. 8 is a perspective view illustrating a virtual image display device 1B according to the present embodiment.

The virtual image display device 1B according to the present embodiment includes heat radiation members 27 (27L, 27R) provided in an external lateral side portion 212 located on a side opposite to an observer US side in a head band portion 2 as illustrated in FIG. 8, in addition to including the same components as those of the virtual image display device 1.

In the virtual image display device 1B, one heat conduction member 5 (right heat conduction member 5 is not shown in the drawing) is provided on each of the right and left sides of the observer US, and the heat conduction member 5 located on the left side is provided inside a cover member 34L, an arm portion 4L, and the head band portion 2 across these member and portions. Meanwhile, although not shown in the drawing, the heat conduction member 5 located on the right side is also provided inside a cover member 34R, an arm portion 4R, and the head band portion 2 across these member and portions.

Among the heat conduction members 5, an end of the heat conduction member 5 disposed on the left side in the observer US is connected to an image forming device 311 which is a heat generating body provided within the cover member 34L, and the other end thereof is connected to a heat radiation member 27L provided on the left side in the observer US in an external lateral side portion 212 of the head band portion 2. Meanwhile, the heat conduction member 5 is disposed at a positon that does not block a light path of light (image light) emitted from the image forming device 311 as described above.

Heat of the image forming device 311 is transmitted to the head band portion 2 through the arm portion 4L by the heat conduction member 5, and is radiated by the heat radiation member 27L provided in the head band portion 2. In addition, although not shown in the drawing, similarly by the heat conduction member 5 disposed on the right side for the observer US, heat of the image forming device 311 which is a heat generating body provided within the cover member 34R is transmitted to the head band portion 2 through the arm portion 4R, and the heat is radiated by the heat radiation member 27R provided on the right side in the observer US in the external lateral side portion 212.

With such a configuration, heat of the image forming devices 311 which are respectively disposed within the right and left cover members 34R and 34L is transmitted to the head band portion 2 through the arm portions 4L and 4R by the corresponding heat conduction members 5, and is radiated by the heat radiation members 27L and 27R disposed in the external lateral side portion 212. Therefore, it is possible to prevent the observer US from feeling the heat by the heat being transmitted to the internal lateral side portion 211. The same is true of a case where the observer US is wearing a helmet or the like.

Meanwhile, the thermal conductivity of the external lateral side portion 212 may be set to be higher than the thermal conductivity of the internal lateral side portion 211. In this case, heat (heat of the image forming device 311) transmitted to the head band portion 2 through the heat conduction member 5 can be easily transmitted to the external lateral side portion 212 side, and thus it is possible to suppress the transmission of the heat to the internal lateral side portion 211 located on the observer US side. In this case, the heat radiation member 27 may not be provided.

In addition, a configuration may also be adopted in which the heat radiation member 27 is provided on a surface on a side opposite to the observer US side in the arm portion 4, and heat of the image forming device 311 is transmitted to the heat radiation member 27 through the heat conduction member 5.

According to the above-described virtual image display device 1B of the present embodiment, it is possible to exhibit the same effects as those of the virtual image display devices 1 and 1A.

Fourth Embodiment

Next, a fourth embodiment of the invention will be described.

A virtual image display device according to the present embodiment has a spectacles-type configuration in which the same display unit as that of the virtual image display device 1A according to the second embodiment is included, but a head band portion 2 and an arm portion 4 are not included, and a mounting member suspended on the ears of an observer US is provided in a cover member constituting a holding member. In this regard, the virtual image display device according to the present embodiment is different from the virtual image display device 1A. Meanwhile, in the following description, the same or substantially the same components as those described above are denoted by the same reference numerals and signs, and a description thereof will be omitted.

Figure 9:
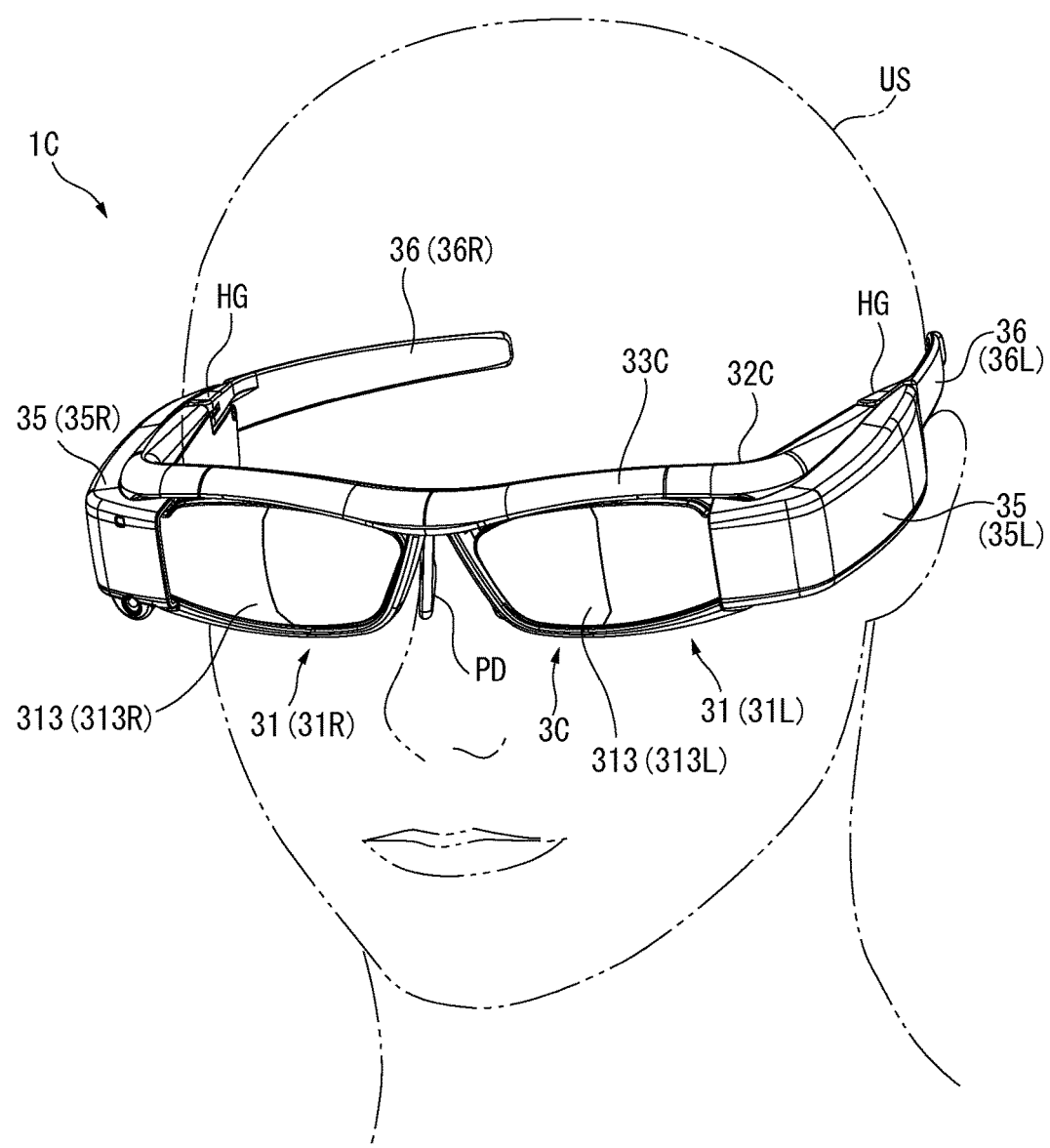
FIG. 9 is a perspective view illustrating a virtual image display device according to a fourth embodiment of the invention.

FIG. 9 is a perspective view illustrating a virtual image display device 1C according to the present embodiment.

As illustrated in FIG. 9, the virtual image display device 1C according to the present embodiment does not include a head band portion 2 and an arm portion 4, includes a display unit 3C having the same configuration as that of the display unit 3A, and has the same function as that of the virtual image display device 1A. Similarly to the display unit 3A, the display unit 3C includes a pair of optical devices 31 (31L, 31R), a holding member 32C that holds the pair of optical devices 31, and a heat conduction member 5.

The holding member 32C includes a frame 33C, cover members 35 (35L, 35R), and mounting members 36 (a mounting member on the left side in an observer US is set to be 36L, and a mounting member on the right side is set to be 36R) which are axially supported by the respective cover members 35.

Similarly to the frame 33, the frame 33C is formed in a U-shape along the forehead and the temporal region of the observer US when seen from the Y-direction side. Meanwhile, in the present embodiment, the frame 33C is formed of a thermal conductive metal, but may be formed of a resin or the like when heat of an image forming device 311 is not transmitted thereto.

The cover members 35 (35L, 35R) are respectively attached to the right and left ends in the U-shape frame 33C. Among these members, an image forming device 311 and a projection lens 312 which constitute the right optical device 31R are disposed within the cover member 35R. Similarly, an image forming device 311 and a projection lens 312 which constitute the left optical device 31L are disposed within the cover member 35L. Further, a communication unit and a control unit, not shown in the drawing, are provided within the cover members 35L and 35R.

The communication unit, connected to an image supply device such as a personal computer (PC), receives image information and transmits the received information to the control unit. The control unit operates the display unit 3C in accordance with the received image information. The communication unit and the control unit may be provided inside the frame 33C.

Meanwhile, the heat conduction member 5 transmits heat of the image forming device 311 to a second cover member 352 constituting the cover member 35, but may transmit the heat to the frame 33C, similar to the heat conduction member 5 in the virtual image display device 1.

The mounting members 36 (36L, 36R) are formed in an arc shape along the temporal region of the observer US. Each of the mounting members 36L and 36R is connected to an end on a side opposite to a light guide member 313 side in a first cover member 351 of each of the respective cover members 35L and 35R, through a hinge portion HG. For this reason, the mounting members 36L and 36R are rotatably provided on the observer US side about a rotating shaft along the Y-direction (vertical direction to the observer US) by the hinge portion HG. Thereby, when the virtual image display device 1C is not mounted, the mounting members 36L and 36R can be folded on the observer US side. On the other hand, the mounting members 36L and 36R in an extended state are suspended on both the ears, and a nose pad PD provided in substantially the middle of the frame 33C is made to abut on the nose, thereby allowing the virtual image display device 1C to be mounted on the head of the observer US.

Meanwhile, in the present embodiment, the hinge portion HG is formed of a material (for example, a synthetic resin) or the like which has a thermal conductivity lower than that of the second cover member 352. For this reason, it is possible to suppress the transmission of heat of the image forming device 311 to the mounting members 36L and 36R, coming into contact with the observer US, through the hinge portions HG.

Effects of Fourth Embodiment

According to the above-described virtual image display device 1C of the present embodiment, the following effects are exhibited, in addition to exhibiting the same effects as those of the virtual image display device 1A.

Since each of the mounting members 36 (36L, 36R) is connected to the first cover member 351 on a side opposite to the second cover member 352 having the heat conduction member 5 connected thereto, it is possible to make heat of the image forming device 311 less likely to be transmitted to the mounting member 36. In addition, when the hinge portion HG is formed of a material having a thermal conductivity lower than that of the second cover member 352, it is possible to make heat from the first cover member 351 less likely to be transmitted to the mounting member 36, for example, compared to a case where the hinge portion HG is formed of the same material as that of the second cover member 352.

Therefore, it is possible to prevent the observer US from feeling heat of the image forming device 311 by the heat being transmitted to the mounting member 36 mounted on the observer US.

Fifth Embodiment

Hereinafter, a fifth embodiment of the invention will be described.

A virtual image display device according to the present embodiment has the same configuration as that of the virtual image display device 1C, and is different from the virtual image display device 1C in terms of further including a heat insulating member. Meanwhile, in the following description, the same or substantially the same components as those described above are denoted by the same reference numerals and signs, and a description thereof will be omitted.

Figure 10:
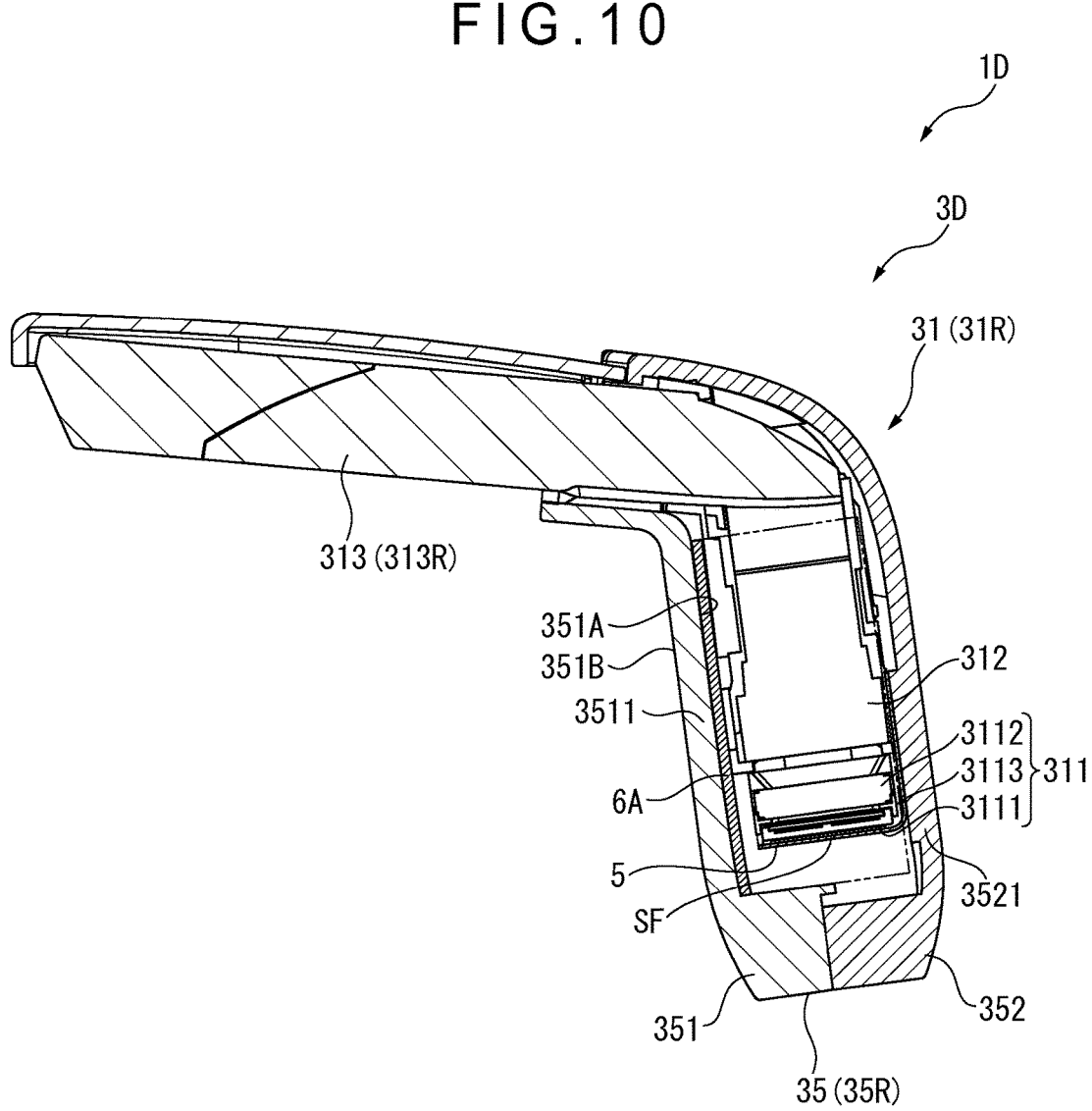
FIG. 10 is a cross-sectional view illustrating a right optical device and a cover member of a display unit included in a virtual image display device according to a fifth embodiment of the invention.

FIG. 10 is a diagram when the cross sections along an XZ plane of a right optical device 31R and a cover member 35R of a display unit 3D in a virtual image display device 1D according to the present embodiment are seen from the Y-direction side.

As illustrated in FIG. 10, the virtual image display device 1D according to the present embodiment has the same configuration and function as those of the virtual image display device 1C except that the device according to the present embodiment further includes a heat insulating member 6A.

The heat insulating member 6A is a sheet-shaped heat insulating material, and is disposed so as to surround both end faces of an image forming device 311, which is a heat generating body, on the Y-direction side and on a side opposite to the Y-direction and to surround an end face (end on a side opposite to the X-direction side in a right optical device 31R) on an observer US side. That is, the heat insulating member 6A is disposed in such a manner that the cross section thereof along an XY plane has substantially a U-shape, facing sideways, which is opened in the X-direction, and is configured to cover the image forming device 311 which is a heat generating body when seen from the observer US side. In other words, a portion of the heat insulating member 6A is located between a first cover member 351 and the image forming device 311. Meanwhile, in the heat insulating member 6A, a region facing an end on the observer US side in the image forming device 311 is connected to an inner surface 351A of the first cover member 351.

Heat generated by the image forming device 311 is blocked by the heat insulating member 6A, and thus the heat is not likely to be transmitted to the first cover member 351 located on the observer US side. Thereby, it is possible to prevent the observer US wearing the virtual image display device 1D from feeling heat from the first cover member 351.

In addition, the heat conduction member 5 having one end coming into surface contact with the image forming device 311 and the other end coming into surface contact with the inner surface of the second cover member 352 is provided within the cover member 35 which is a container. A heat conduction path through which heat of the image forming device 311 is transmitted to the second cover member 352 is formed by the heat conduction member 5, and the heat can be radiated by the second cover member 352, thereby making the heat less likely to be felt from the first cover member 351. Meanwhile, the same is true of a case where the other end of the heat conduction member 5 is connected to the frame 33C so as to be capable of heat conduction, and a heat conduction path through which heat of the image forming device 311 is transmitted to the second cover member 352 is formed.

Although not shown in the drawing, the heat insulating member 6A is provided within the cover member 35L, and the position of the heat insulating member 6A disposed within the cover member 35L is the same as the position of the heat insulating member 6A with respect to the image forming device 311 and the cover member 35 of the right optical device 31R. For this reason, heat of the image forming device 311 constituting the left optical device 31L is transmitted to the second cover member 352 or the frame 33C through the heat conduction member 5, but is blocked by the heat insulating member 6A, and thus the heat is not likely to be transmitted to the first cover member 351.

Thereby, it is possible to make the heat less likely to be felt from the first cover member 351 also in the cover member 35L.

Figure 11:
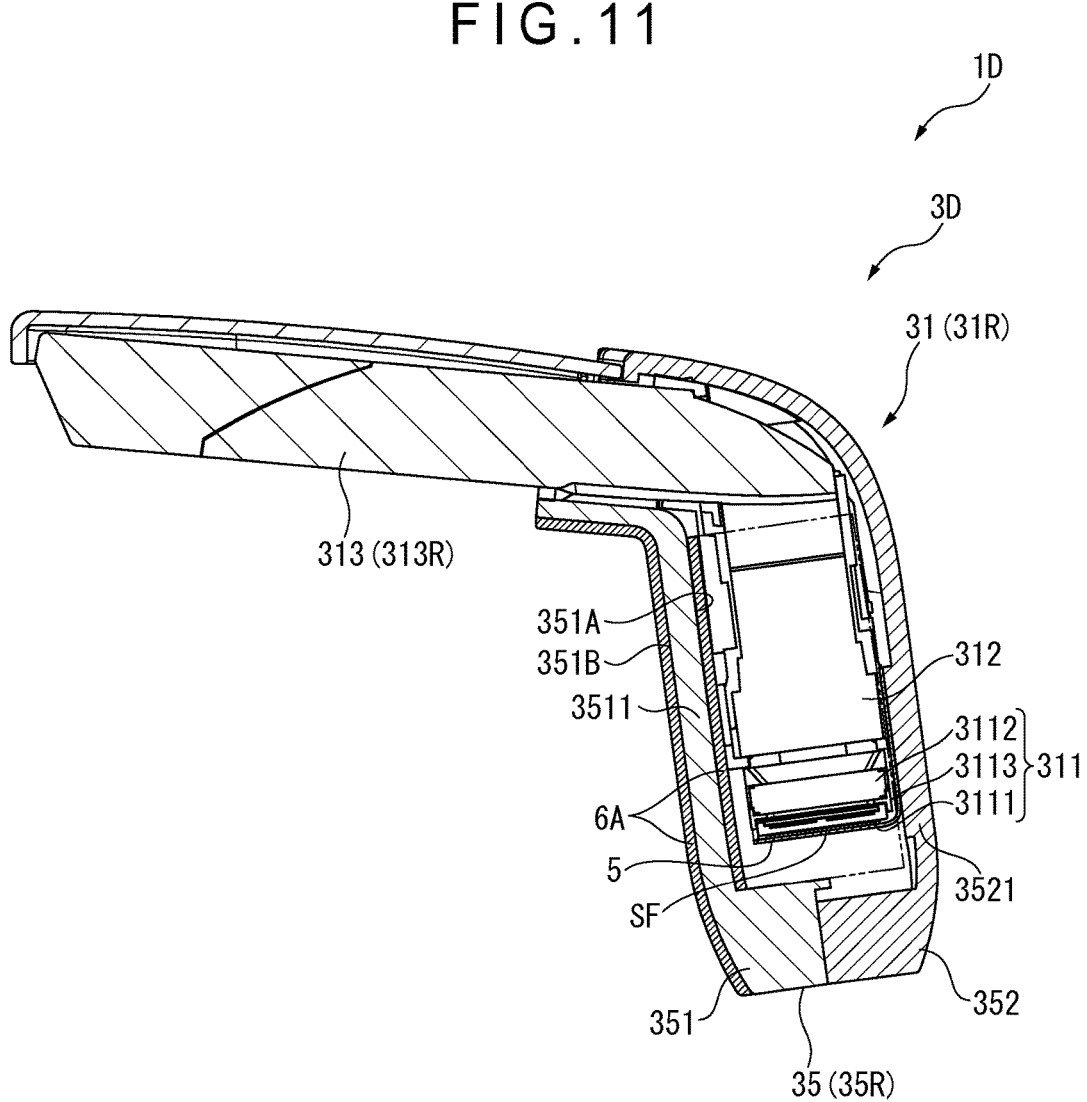
FIG. 11 is a diagram illustrating another arrangement example of a heat insulating member according to the fifth embodiment.
Figure 11:
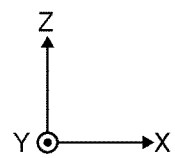

FIG. 11 is a diagram illustrating another arrangement example of the heat insulating member 6A.

In addition, the heat insulating member 6A may be provided on the outer surface 351B of the first cover member 351 rather than on the inner surface 351A of the first cover member 351, or may be provided on each of the inner surface 351A and the outer surface 351B as illustrated in FIG. 11. Even when the heat insulating member 6A is provided on the outer surface 351B, it is preferable that the heat insulating member is provided so as to cover the image forming device 311 which is a heat generating body when the cover member 35 is seen from the observer US side, and it is more preferable that the heat insulating member is provided so as to cover the entirety of the outer surface 351B. In this manner, even when the heat insulating member 6A is disposed, it is possible to make the observer US wearing a virtual image display device 1D less likely to feel heat.

Meanwhile, a cover member adopted in the virtual image display device 1D according to the present embodiment may not be the cover member 35 including the first cover member 351 and the second cover member 352 that differ from each other in thickness dimension and thermal conductivity, or may be, for example, the cover member 34.

In addition, the heat insulating member 6A may be applied to the virtual image display devices 1, 1A, and 1B mentioned above.

Effects of Fifth Embodiment

According to the above-described virtual image display device 1D of the present embodiment, it is possible to exhibit the same effects as those of the virtual image display device 1C and to exhibit the following effects.

When the cover member 35 is seen from the observer US side, the heat insulating member 6A is provided so as to cover the image forming device 311 which is a heat generating body. Accordingly, it is possible to suppress the transmission of the heat to the first cover member 351 constituting a lateral side portion on an observer side in the cover member 35 which is a container. For this reason, the temperature of the first cover member 351 can be prevented from rising due to the heat, and thus it is possible to prevent the observer US wearing the virtual image display device 1D from feeling heat of the image forming device 311 through the first cover member 351. Therefore, it is possible to improve the feeling of wearing of the virtual image display device 1D.

The cover member 35 includes the first cover member 351 constituting an observer side lateral side portion located on the observer US side, and the heat insulating member 6A is provided in the first cover member 351. Accordingly, it is possible to easily dispose the heat insulating member 6A within the cover member 35. Therefore, it is possible to reliably make heat of the image forming device 311 less likely to be transmitted to the first cover member 351 and to reliably improve the feeling of wearing of the virtual image display device 1D. Meanwhile, as described above, the same is true of a case where the heat insulating member 6A is provided on the outer surface 351B of the first cover member 351.

The heat insulating member 6A is provided between the first cover member 351 and the image forming device 311. Accordingly, it is possible easily dispose the heat insulating member 6A and to reliably block heat of the image forming device 311 by the heat insulating member 6A. Meanwhile, when a gap or another member is interposed between the heat insulating member 6A and the inner surface 351A, it is possible to prevent heat transmitted to the heat insulating member 6A from being directly transmitted to the first cover member 351.

The heat insulating member 6A is disposed within the cover member 35 so as to surround the image forming device 311. Accordingly, it is possible to reliably locate the heat insulating member 6A between the image forming device 311 and the first cover member 351, and to make heat of the image forming device 311 less likely to be transmitted to the first cover member 351. Therefore, it is possible to improve the feeling of wearing of the virtual image display device 1D more reliably.

The heat conduction member 5 having one end connected to the image forming device 311 and the other end connected to the second cover member 352 is provided, thereby forming a heat conduction path through which heat of the image forming device 311 is transmitted to the outside of the cover member 35. Accordingly, a temperature rise of the image forming device 311 and a temperature rise within the cover member 35 can be suppressed, and thus it is possible to suppress the deterioration of the image forming device 311. In addition, heat of the image forming device 311 is transmitted to the second cover member 352, and thus it is possible to suppress the transmission of the heat to the first cover member 351 and to improve the feeling of wearing of the virtual image display device 1D more reliably. The same is true of a case where a heat conduction path for transmitting heat of the image forming device 311 to the second cover member 352 is formed by the heat conduction member 5.

Meanwhile, as described above, the other end of the heat conduction member 5 may be connected to the frame 33C. In this case, heat of the image forming device 311 is transmitted to the frame 33C of which at least a portion is exposed to the outside, through the heat conduction member 5. Thereby, it is possible to radiate the heat to the outside of the virtual image display device 1D. Therefore, it is possible to reliably suppress the transmission of heat of the image forming device 311 to the first cover member 351 and to suppress a temperature rise and deterioration of the image forming device 311.

Here, when the virtual image display device 1D is used, the image forming device 311 generates a relatively high-temperature heat. On the other hand, heat generated by the image forming device 311 can be prevented from being transmitted to the first cover member 351 by the heat insulating member 6A, and thus it is possible to improve the feeling of wearing of the virtual image display device 1D as described above. In addition, since the image forming device 311 has a characteristic of being vulnerable to heat, it is possible to radiate heat of the image forming device 311 to the outside of the cover member 35 by the heat conduction path, thereby allowing a temperature rise and deterioration of the image forming device 311 to be suppressed.

Sixth Embodiment

Next, a sixth embodiment of the invention will be described.

A virtual image display device according to the present embodiment has the same configuration as that of the virtual image display device 1D. Here, in the virtual image display device 1D, the heat insulating member 6A is constituted by a sheet-shaped heat insulating material. On the other hand, in the virtual image display device according to the present embodiment, a heat insulating member is constituted by a heat insulating material which is filled into a case member. In this regard, the virtual image display device according to the present embodiment is different from the virtual image display device 1D. Meanwhile, in the following description, the same or substantially the same components as those described above are denoted by the same reference numerals and signs, and a description thereof will be omitted.

Figure 12:
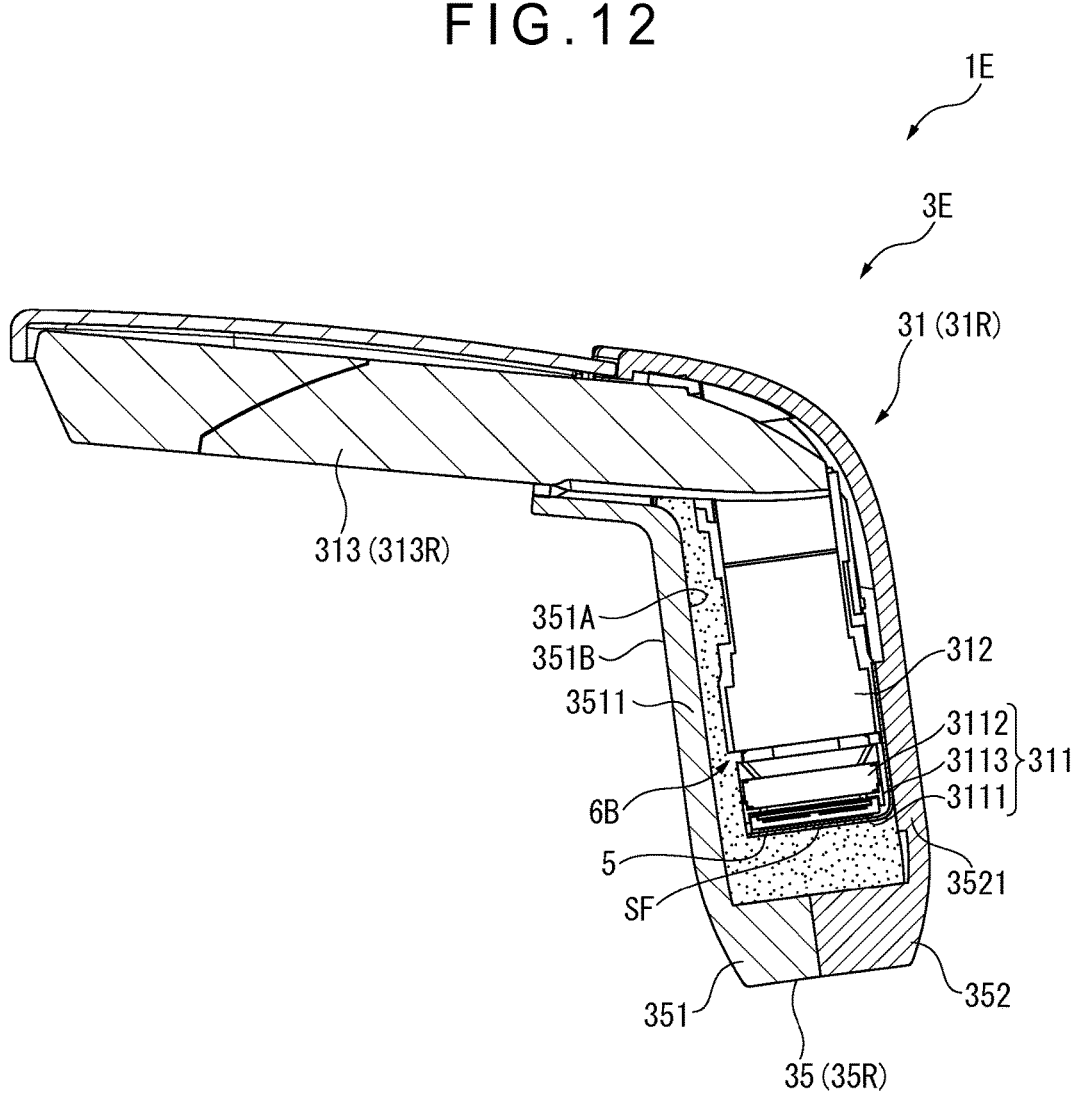
FIG. 12 is a cross-sectional view illustrating a right optical device and a cover member of a display unit included in a virtual image display device according to a sixth embodiment of the invention.

FIG. 12 is a diagram when the cross sections along an XZ plane of a right optical device 31R and a cover member 35R of a display unit 3E in a virtual image display device 1E according to the present embodiment are seen from the Y-direction side.

As illustrated in FIG. 12, the virtual image display device 1E according to the present embodiment has the same configuration and function as those of the virtual image display device 1D except that the device according to the present embodiment includes a heat insulating member 6B instead of the heat insulating member 6A.

The heat insulating member 6B is constituted by a foamed heat insulating material such as high-expanded polyethylene foam. The heat insulating member 6B surrounds an image forming device 311 which is a heat generating body by the foamed heat insulating material being solidified in a state of being injected into a cover member 35 and being filled into a gap within the cover member 35, and is located between the image forming device 311 and a first cover member 351. The transmission of heat of the image forming device 311 to the first cover member 351 is suppressed by the heat insulating member 6B. That is, when the cover member 35 is seen from an observer US side, at least a portion of the heat insulating member 6B is provided so as to cover the image forming device 311 between the first cover member 351 and the image forming device 311.

For this reason, similarly to a case where the heat insulating member 6A is adopted, heat generated by the image forming device 311 is blocked by the heat insulating member 6B located between the image forming device 311 and the first cover member 351, and thus the transmission of the heat to the first cover member 351 is suppressed. Thereby, it is possible to prevent the observer US wearing the virtual image display device 1E from feeling heat from the first cover member 351.

Meanwhile, as described above, a heat conduction path through which heat of the image forming device 311 is transmitted to a second cover member 352 or a frame 33C is formed by a heat conduction member 5 provided within the cover member 35. Thereby, the heat can be radiated to the outside of the cover member 35, and thus it is possible to reliably suppress the transmission of heat to the first cover member 351.

In addition, although not shown in the drawing, the heat insulating member 6B is also filled into a cover member 35L located on the left side in the observer US, and the heat conduction member 5 is disposed within the cover member. Thereby, heat of the image forming device 311 constituting a left optical device 31L is transmitted to the second cover member 352 through the heat conduction member 5, but is blocked by the heat insulating member 6B and is not likely to be transmitted to the first cover member 351. Therefore, it is possible to make the heat less likely to be felt from the first cover member 351 also in the cover member 35L.

Meanwhile, also in the virtual image display device 1E according to the present embodiment, a cover member may not be the cover member 35, and may be, for example, the cover member 34.

In addition, the heat insulating member 6B may be applied to the virtual image display devices 1, 1A, and 1B.

Effects of Sixth Embodiment

According to the above-described virtual image display device 1E of the present embodiment, it is possible to exhibit the same effects as those of the virtual image display device 1D and to exhibit the following effects.

It is possible to reliably locate the heat insulating member 6B between the image forming device 311 and the first cover member 351 by the heat insulating member 6B filled into the cover member 35, and to make heat of the image forming device 311 less likely to be transmitted to the first cover member 351. Therefore, it is possible to make heat less likely to be felt from the first cover member 351 and to reliably improve the feeling of wearing of the virtual image display device 1E.

Seventh Embodiment

Next, a seventh embodiment of the invention will be described.

A virtual image display device according to the present embodiment has the same configuration as that of the virtual image display device 1D. However, in the virtual image display device according to the present embodiment, the configuration and arrangement of an image forming device are different from those of the image forming device 311, and a reflection member that reflects an image emitted from the image forming device is provided. In these regards, the virtual image display device according to the present embodiment is different from the virtual image display device 1D. Meanwhile, in the following description, the same or substantially the same components as those described above are denoted by the same reference numerals and signs, and a description thereof will be omitted.

Figure 13:
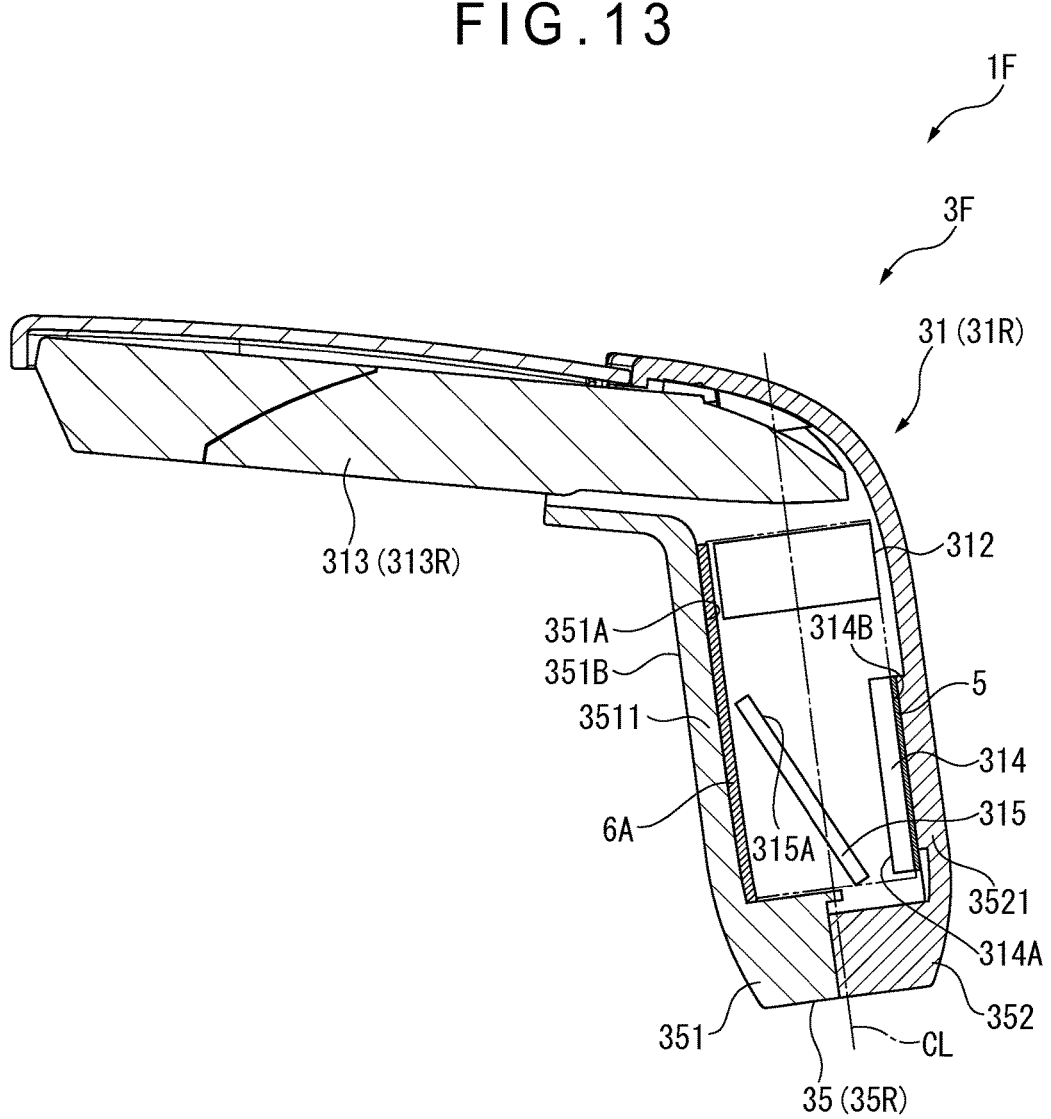
FIG. 13 is a cross-sectional view illustrating a right optical device and a cover member of a display unit included in a virtual image display device according to a seventh embodiment of the invention.

FIG. 13 is a diagram when the cross sections along an XZ plane of a right optical device 31R and a cover member 35R of a display unit 3D in a virtual image display device 1F according to the present embodiment are seen from the Y-direction side.

The virtual image display device 1F according to the present embodiment has the same configuration and function as those of the virtual image display device 1D except that the device according to the present embodiment includes a display unit 3F instead of the display unit 3D. In addition, as illustrated in FIG. 13, the display unit 3F has the same configuration as that of the display unit 3D, except that the display unit according to the present embodiment includes an image forming device 314 instead of the image forming device 311 and further includes a reflection member 315. That is, the display unit 3F includes optical devices 31 (31L, 31R), a holding member 32 including a frame 33C and cover members 35 (35L, 35R), a heat conduction member 5, and a heat insulating member 6A, and each of the optical devices 31 includes an image forming device 314, a reflection member 315, a projection lens 312, and light guide members 313 (313L, 313R).

In the following description, components located on the right side in an observer US out of members constituting the display unit 3F will be described with reference to FIG. 12, but the same is true of components located on the left side.

Similarly to the image forming device 311, the image forming device 314 forms an image in response to an image signal to be input, and emits the formed image. In the present embodiment, the image forming device 314 is constituted by a display panel which is a self-luminous display panel such as an organic EL panel, and is disposed on the second cover member 352 side. Specifically, the image forming device 314 is located to be closer to the second cover member 352 than a center line CL in the X-direction in an accommodation space within the cover member 35R, and the reflection member 315 is located on a first cover member 351 side with respect to the image forming device 314. The image forming device 314 is disposed such that an emission surface 314A of an image faces the first cover member 351 side which is the observer US side. Meanwhile, although the image forming device 314 is adopted in the present embodiment, the image forming device 311 disposed at the same position and in the same orientation as the image forming device 314 may be adopted.

The reflection member 315 reflects an image (image light) emitted from the image forming device 314 toward the projection lens 312. A reflection surface 315A of the reflection member 315 is inclined to an optical axis of the projection lens 312 so as to face the image forming device 314 and the projection lens 312.

Image light emitted to the observer US side from the image forming device 314 disposed in this manner is reflected by the reflection member 315 and is incident on the projection lens 312. The image light projected by the projection lens 312 is incident on the light guide member 313R as described above, and thus is guided to the right eye of the observer US.

In the present embodiment, the heat conduction member 5 is formed in a sheet shape and is configured such that one surface of the heat conduction member 5 comes into surface contact with a surface 314B on a side opposite to the emission surface 314A in the image forming device 314, and the other surface thereof is connected to the inner surface of the second cover member 352. That is, as described above, a heat conduction path through which heat of the image forming device 314 is transmitted to the second cover member 352 is formed by the heat conduction member 5. Thereby, heat of the image forming device 314, which is a heat generating body in the right optical device 31R, can be transmitted to the second cover member 352 through the heat conduction member 5 with a good efficiency, and can be radiated from the outer surface of the second cover member 352. Meanwhile, the heat conduction member 5 may be disposed so as to connect the image forming device 314 and the frame 33C.

In addition, the reflection member 315 is located between the first cover member 351 and the image forming device 314, and thus it is possible to increase a dimension between the first cover member 351 and the image forming device 314 and to suppress the transmission of heat of the image forming device 314 to the first cover member 351.

Further, similarly to the virtual image display device 1D, the heat insulating member 6A is provided within the cover member 35. The heat insulating member is located on the Y-direction side and on a side opposite to the Y-direction in the image forming device 314 and the reflection member 315, and is located on the observer US side thereof. That is, the heat insulating member 6A is disposed so as to surround the image forming device 314 and the reflection member 315 on the Y-direction side, on a side opposite to the Y-direction, and on the opposite side (observer US side) to the X-direction. Thereby, even when heat of the image forming device 314 is radiated to the accommodation space of the cover member 35, the heat is not likely to be transmitted to the first cover member 351.

Meanwhile, the heat insulating member 6A may be provided on an inner surface 351A of the first cover member 351, may be provided on an outer surface 351B of the first cover member 351, or may be provided on each of the inner surface 351A and the outer surface 351B. In addition, a heat insulating member 6B may be formed on the inner surface 351A by firmly fixing the foamed heat insulating material onto the inner surface 351A, or may be formed by filling the foamed heat insulating material into a position separated from a light path of the image forming device 314. Further, a cover member 34 may be adopted instead of the cover member 35.

In addition, such a configuration of the virtual image display device 1F may be applied to the virtual image display devices 1, 1A, and 1B.

Effects of Seventh Embodiment

According to the above-described virtual image display device 1F of the present embodiment, it is possible to exhibit the same effects as those of the virtual image display device 1D and to exhibit the following effects.

The image forming device 314 generating a relatively high-temperature heat during the use of the virtual image display device 1F is disposed on a side opposite to the observer US side within the cover member 35, and the reflection member 315 is disposed on the observer US side within the cover member 35. Thereby, it is possible to increase a dimension between the image forming device 314 and the first cover member 351. In addition, the reflection member 315 can be used as an obstacle that blocks the transmission of heat generated by the image forming device 314 to the first cover member 351. Thereby, it is possible to reliably suppress the transmission of heat of the image forming device 314 to the first cover member 351 and to further reliably improve the feeling of wearing of the virtual image display device 1F.

Eighth Embodiment

Next, an eighth embodiment of the invention will be described.

A virtual image display device according to the present embodiment has the same configuration as that of each of the virtual image display devices 1, 1A, and 1B. In addition thereto, the virtual image display device includes a heat insulating member which is disposed so as to cover a heat generating body provided within an exterior case 21 of a head band portion 2, when seen from an observer US side. In this regard, the virtual image display device according to the present embodiment is different from the virtual image display device 1. Meanwhile, in the following description, the same or substantially the same components as those described above are denoted by the same reference numerals and signs, and a description thereof will be omitted.

Figure 14:
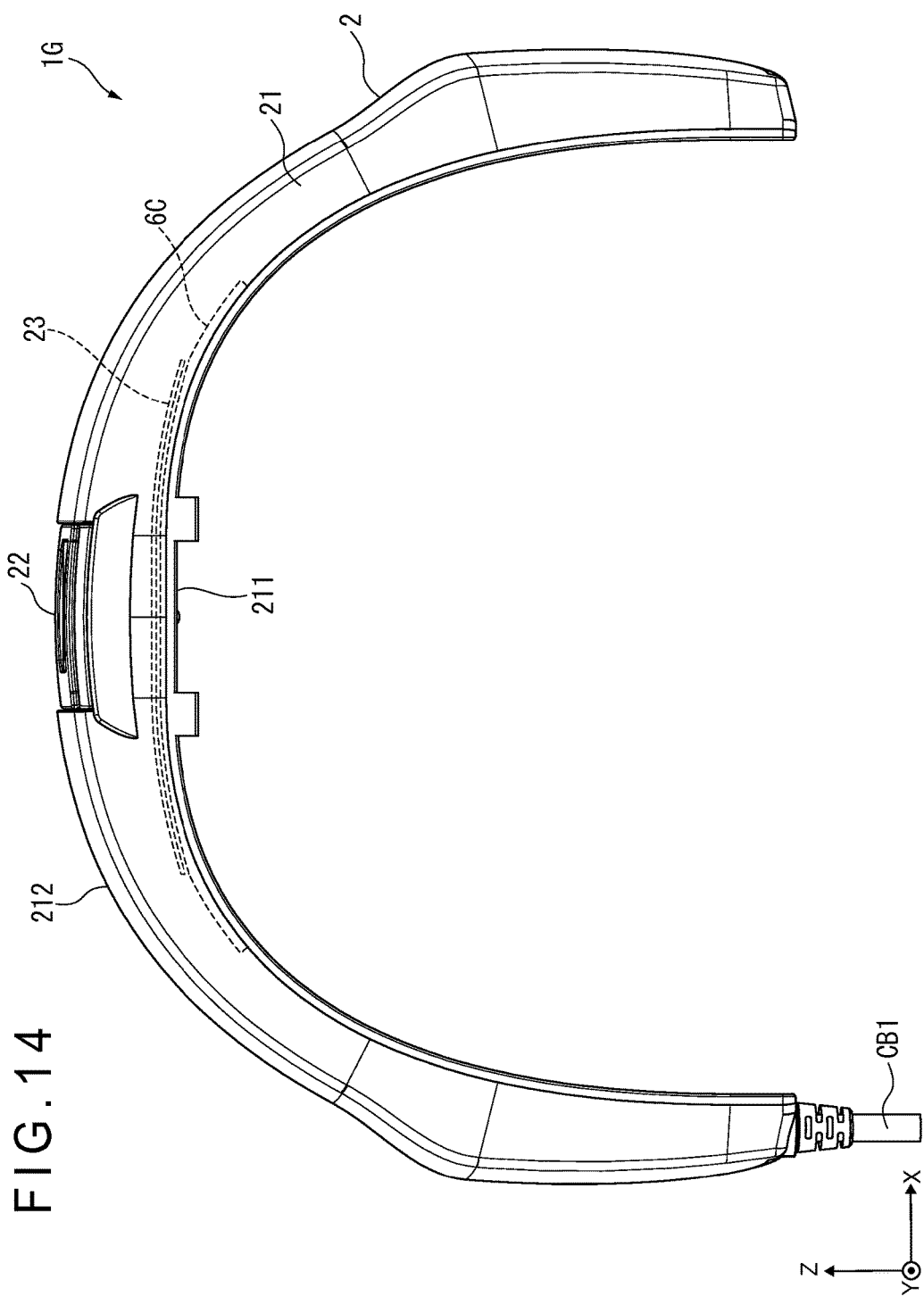
FIG. 14 is a diagram illustrating a head band portion included in a virtual image display device according to an eighth embodiment of the invention.

FIG. 14 is a diagram illustrating the arrangement of a heat insulating member 6C included in a virtual image display device 1G according to the present embodiment, and is a diagram when the head band portion 2 is seen from the Y-direction side. Meanwhile, in FIG. 14, some components such as a mounting member 24 are not shown.

As illustrated in FIG. 14, the virtual image display device 1G according to the present embodiment has the same configuration as those of any one of the virtual image display devices 1, 1A, and 1B except that the device according to the present embodiment further includes a heat insulating member 6C constituted by a sheet-shaped heat insulating material.

The heat insulating member 6C is provided inside the exterior case 21 as a housing constituting the head band portion 2. Specifically, the heat insulating member 6C is provided so as to cover a control unit 23 which is a heat generating body, when the exterior case 21 is seen from the observer US side. More specifically, the heat insulating member 6C faces the control unit 23, and is disposed so as to interpose from the Y-direction side and the opposite side to the Y-direction and to surround the control unit 23. The heat insulating member 6C is fixed to the inner surface of the internal lateral side portion 211 facing the observer US in the exterior case 21 using an adhesive or the like. That is, the heat insulating member 6C is located between the internal lateral side portion 211 and the control unit 23.

Heat of the control unit 23 which is a heat generating body is not likely to be transmitted to the internal lateral side portion 211 by the heat insulating member 6C. Thereby, it is possible to make the observer US wearing the head band portion 2 on his or her head less likely to feel heat.

According to the above-described virtual image display device 1G of the present embodiment, it is possible to exhibit the same effects as those of the virtual image display device 1D.

Meanwhile, a heat conduction member which is connected to the control unit 23 and transmits heat of the control unit 23 to another position to thereby suppress a temperature rise of the control unit 23 may be provided within the exterior case 21. As such a heat conduction member, the same configuration as that of the heat conduction member 5 can be illustrated.

In addition, instead of the heat insulating member 6C constituted by a sheet-shaped heat insulating material, a heat insulating member configured such that the same foamed heat insulating material as that of the heat insulating member 6B is firmly fixed to the inner surface of the internal lateral side portion 211 may be provided.

Further, the heat insulating member 6C may also be provided on the outer surface of the internal lateral side portion 211, instead of or in addition to the heat insulating member 6C provided on the inner surface of the internal lateral side portion 211.

Ninth Embodiment

Next, a ninth embodiment of the invention will be described.

A virtual image display device according to the present embodiment has the same configuration as that of the virtual image display device 1G, but is different from the virtual image display device 1G in that the device according to the present embodiment includes a heat insulating member filled into at least a portion of a region of the exterior case 21, instead of the heat insulating member 6C constituted by a sheet-shaped heat insulating material. Meanwhile, in the following description, the same or substantially the same components as those described above are denoted by the same reference numerals and signs, and a description thereof will be omitted.

Figure 15:
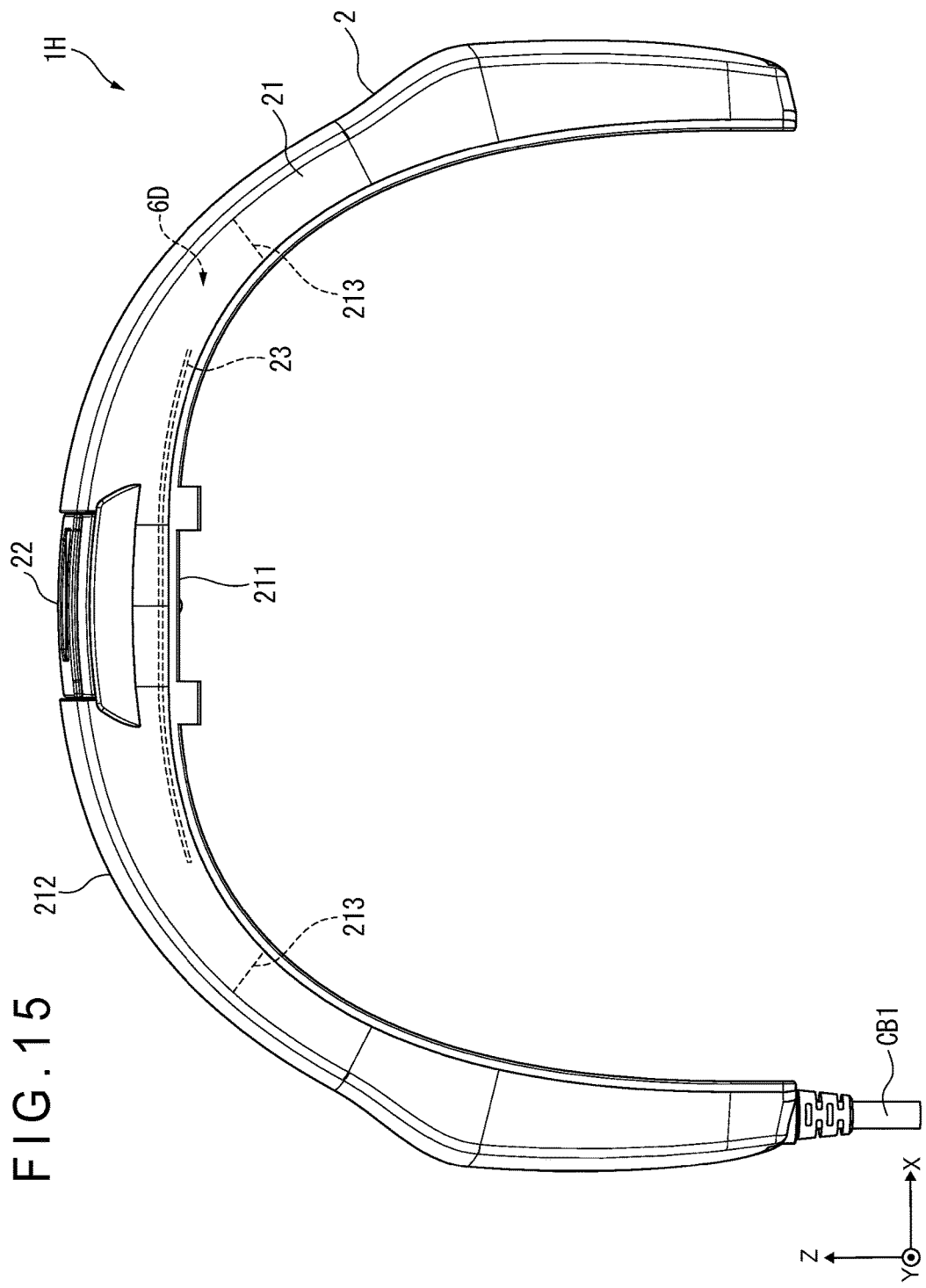
FIG. 15 is a diagram illustrating a head band portion included in a virtual image display device according to a ninth embodiment of the invention.
Figure 16:
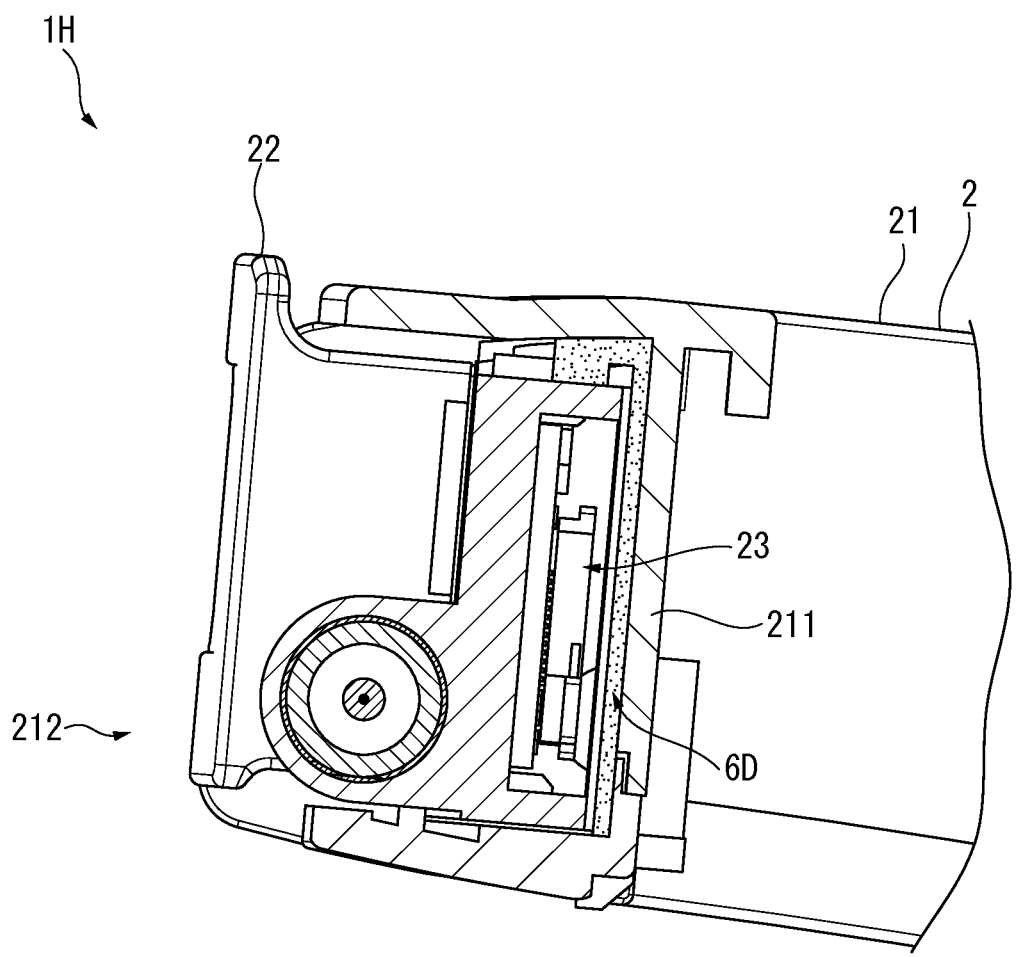
FIG. 16 is a cross-sectional view illustrating the head band portion according to the ninth embodiment.

FIGS. 15 and 16 are diagrams illustrating the arrangement of a heat insulating member 6D included in a virtual image display device 1H according to the present embodiment. Specifically, FIG. 15 is a diagram when a head band portion 2 is seen from the Y-direction side, and FIG. 16 is a diagram when the cross section along a YZ plane in the headband portion 2 is seen from the opposite side to the X-direction side. Meanwhile, in FIG. 15, some components such as a mounting member 24 are not shown.

As illustrated in FIGS. 15 and 16, the virtual image display device 1H according to the present embodiment has the same configuration as that of the virtual image display device 1G except that the device according to the present embodiment further includes the heat insulating member 6D instead of the heat insulating member 6C.

The heat insulating member 6D is constituted by a heat insulating material filled into the exterior case 21 and is located between an observer US and a control unit 23 as a heat generating body and to thereby suppress the transmission of heat of the control unit 23, which is a heat generating body, to an internal lateral side portion 211. The heat insulating member 6D is constituted by the same foamed heat insulating material as that of the heat insulating member 6B, and is formed between the control unit 23 and the inner surface of the internal lateral side portion 211, similar to the heat insulating member 6C.

In the present embodiment, as illustrated in FIG. 15, a pair of wall portions 213 are formed inside the exterior case 21 so as to interpose the control unit 23. The wall portions 213 set a range in which the heat insulating member 6D is formed within the exterior case 21, and the heat insulating member 6D is formed in a range to such an extent as to cover the control unit 23 (range to such an extent as to surround the control unit 23) in the X-direction and the Y-direction, when seen from the observer US side, by the wall portions 213. However, the heat insulating member 6D may be formed in the entire accommodation space which is formed inside the exterior case 21 and accommodates the control unit 23 and the like therein.

Also in the virtual image display device 1H in which the heat insulating member 6D is adopted, it is possible to exhibit the same effects as those of the virtual image display device 1G in which the heat insulating member 6C is adopted.

Meanwhile, the imaging unit 22 may be disposed at a position where the control unit 23 is disposed in the exterior case 21, or the control unit 23 may be disposed at another position. The imaging unit 22 is a heat generating body that generates heat during the operation thereof, and thus the amount of heat generated may be large depending on the model of the imaging unit 22. On the other hand, the heat insulating member 6C or the heat insulating member 6D is disposed between the imaging unit 22 and the observer US, and thus it is possible to make the observer US less likely to feel heat of the imaging unit 22 and to improve the feeling of wearing of a virtual image display device (image display device).

Tenth Embodiment

Next, a tenth embodiment of the invention will be described.

A virtual image display device according to the present embodiment has the same configuration as that of the virtual image display device 1C, but includes an imaging unit as a heat generating body which is provided within a cover member 35R, and a heat insulating member disposed between the imaging unit and an observer US. In these regards, the virtual image display device according to the present embodiment is different from the virtual image display device 1C. Meanwhile, in the following description, the same or substantially the same components as those described above are denoted by the same reference numerals and signs, and a description thereof will be omitted.

Figure 17:
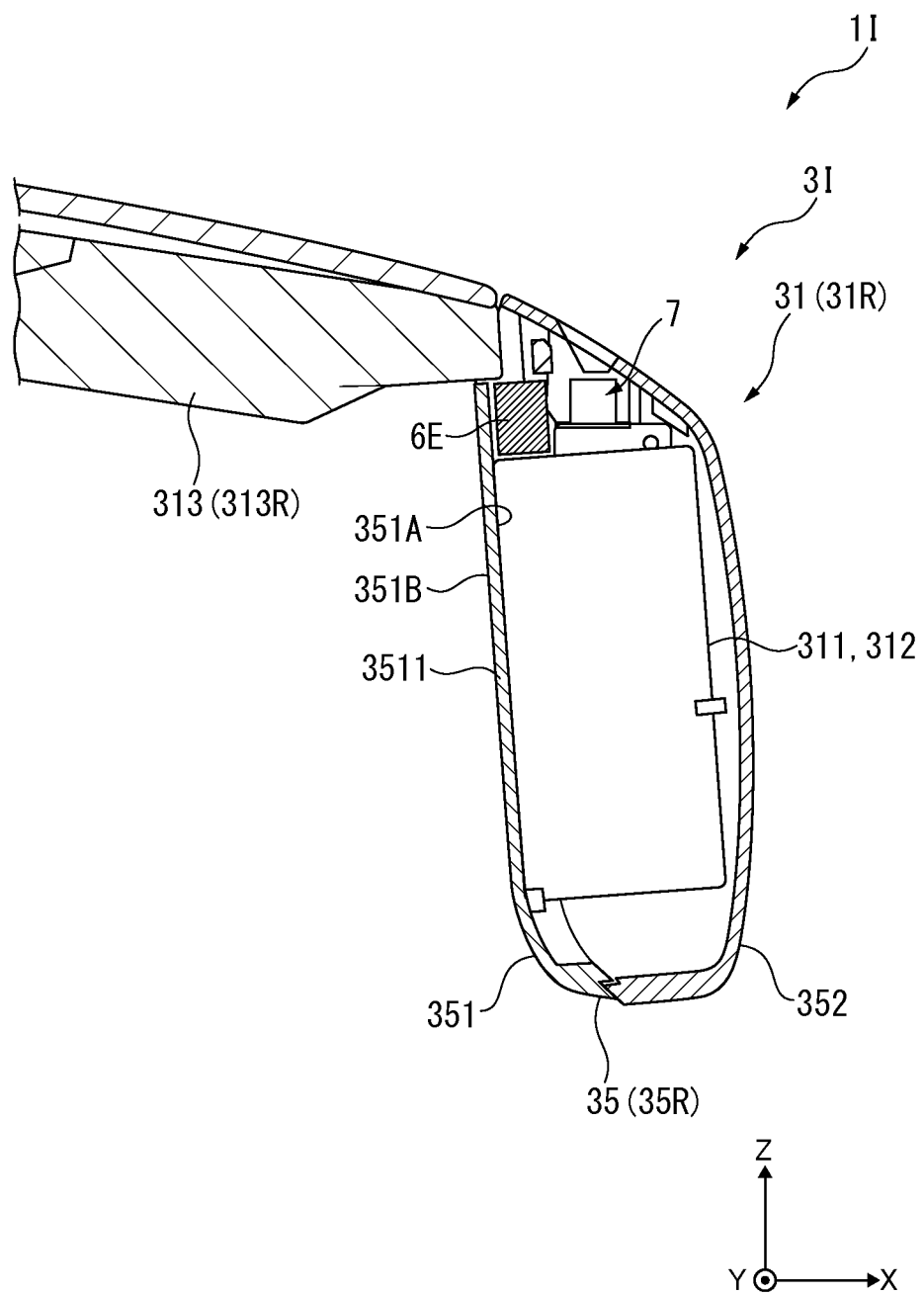
FIG. 17 is a cross-sectional view illustrating a right optical device, a cover member, and an imaging unit of a display unit included in a virtual image display device according to a tenth embodiment of the invention.

FIG. 17 is a diagram when the cross sections along an XZ plane of a right optical device 31R and a cover member 35R of a display unit 31 in a virtual image display device 1I according to the present embodiment are seen from the Y-direction side.

As illustrated in FIG. 17, the virtual image display device 1I according to the present embodiment has the same configuration and function as those of the virtual image display device 1C except that the device according to the present embodiment includes an imaging unit 7 and a heat insulating member 6E.

The imaging unit 7 is disposed within a cover member 35R as a container so that an imaging direction faces the outside of the cover member 35R (specifically, along a visual direction of an observer US). Although not specifically shown in the drawing, the imaging unit 7 is disposed on the lower side (opposite side to the Y-direction side) of a projection lens 312 constituting the right optical device 31R. The imaging unit 7 is connected to a control device disposed outside the cover member 35R through a cable not shown in the drawing, and transmits a captured image to the control device.

The heat insulating member 6E is disposed between the imaging unit 7 and the observer US within the cover member 35R. The heat insulating member 6E makes the observer US less likely to feel heat of the imaging unit 7 which is a heat generating body, and suppresses the transmission of heat of the imaging unit 7 to a first cover member 351 located on the observer US side in the present embodiment.

The heat insulating member 6E may be a sheet-shaped heat insulating material, similar to the heat insulating member 6A, or may be formed by filling a foamed heat insulating material constituting the heat insulating member 6E between the imaging unit 7 and the inner surface of a side portion 3511.

In addition, the heat insulating member 6E may be disposed on the inner surface of the side portion 3511 which faces the observer US in the first cover member 351, or may be disposed on the outer surface of the side portion 3511. In addition, the heat insulating member 6E may be attached to a side portion (for example, a side portion on a side opposite to the Y-direction side) which intersects the side portion 3511 in the first cover member 351, may be attached to the projection lens 312, or may be provided in the imaging unit 7.

According to the virtual image display device 1I in which the heat insulating member 6E is adopted, it is possible to exhibit the same effects as the effects exhibited by the virtual image display device 1H, in addition to effects exhibited by the virtual image display device 1C.

Meanwhile, in the virtual image display device 1I, the cover member 35 is adopted as a container that accommodates the imaging unit 7 therein as a heat generating body. However, the invention is not limited thereto, and the cover member 34 may be adopted as a container. In addition, even when the cover member adopted in the virtual image display device 1I is either of the cover members 34 and 35, the heat insulating members 6A and 6B may be adopted. In addition, when the heat insulating member is disposed between the imaging unit 7 and the observer US, the heat insulating member may be provided on the outer surface of the cover member 34.

Further, the imaging unit 7 is provided within a cover member located on the right side for the observer US, but may be provided within a cover member located on the left side or may be provided within each of the cover members. Even when the imaging unit 7 is provided within the cover member located on the left side, it is possible to apply the configuration described in the present embodiment.

Eleventh Embodiment

Next, an eleventh embodiment of the invention will be described.

A virtual image display device according to the present embodiment has the same configuration as that of the virtual image display device 1D, but is configured such that a battery as a heat generating body is provided in each of mounting members 36 (36L, 36R) and a heat insulating member is provided on a surface on an observer US side in the mounting members 36 and the battery. In these regards, the virtual image display device according to the present embodiment is different from the virtual image display device 1D. Meanwhile, in the following description, the same or substantially the same components as those described above are denoted by the same reference numerals and signs, and a description thereof will be omitted.

Figure 18:
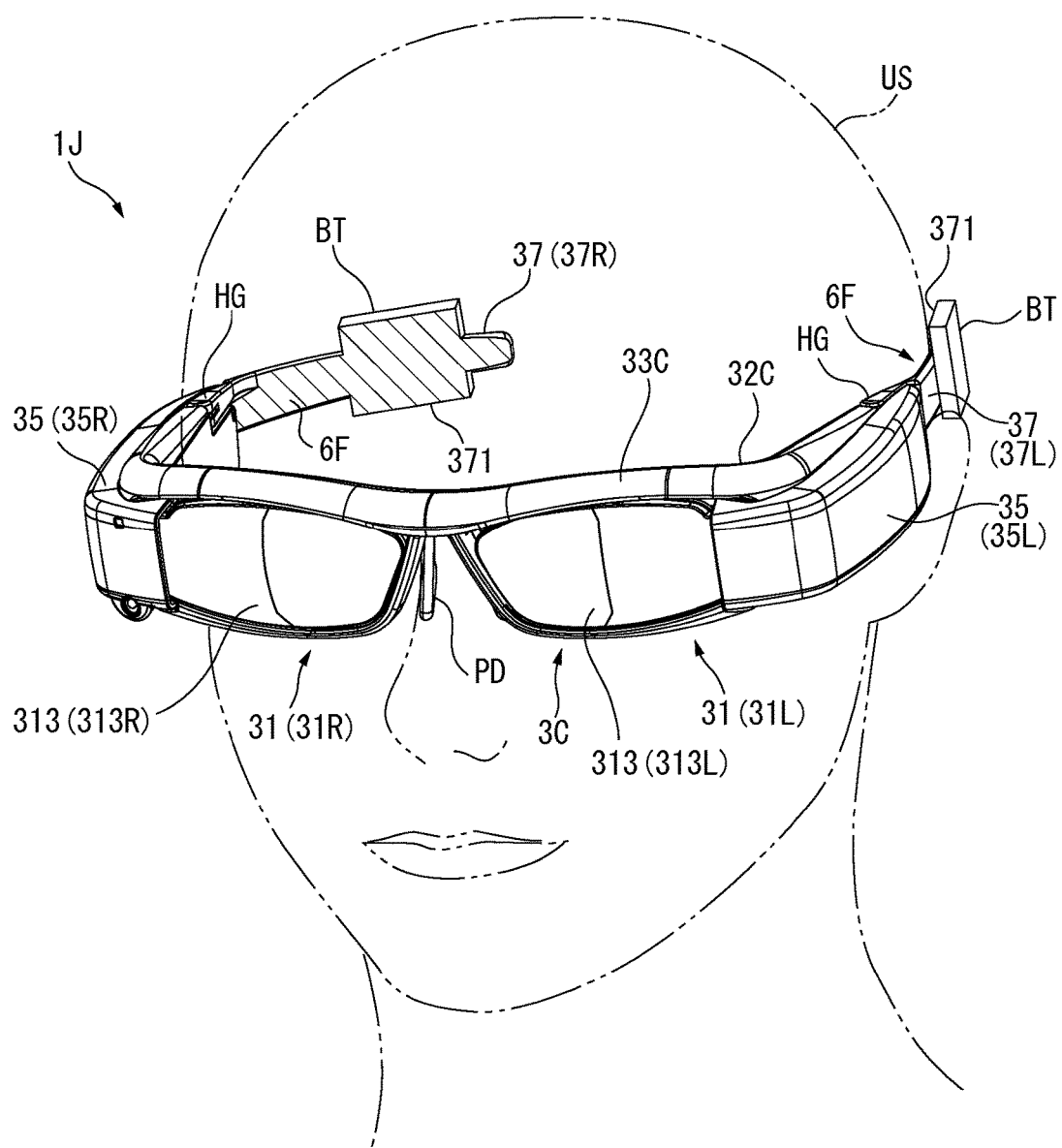
FIG. 18 is a perspective view illustrating the virtual image display device according to the tenth embodiment of the invention.

FIG. 18 is a perspective view illustrating a virtual image display device 1J according to the present embodiment.

As illustrated in FIG. 18, the virtual image display device 1J according to the present embodiment has the same configuration and function as those of the virtual image display device 1D except that the device according to the present embodiment includes mounting members 37 instead of the mounting members 36, and includes batteries BT attached to the respective mounting members 37 and heat insulating members 6F provided on surfaces on an observer US side in the respective mounting members 37.

The battery BT is a secondary battery which is detachably provided in each of the mounting members 37. The battery BT is a heat generating body because of the battery generating heat during the use and charging thereof.

The mounting members 37 (the mounting member on the left side in the observer US is set to be 37L, and the mounting member on right side is set to be 37R) have the same shapes as the mounting members 36L and 36R, and are rotatably attached to cover members 35L and 35R, respectively, on the observer US side through hinge portions HG, similar to the mounting members 36L and 36R. An accommodating portion 371 as a container which detachably accommodates the battery BT therein is provided on the tip side (opposite side to each of the corresponding cover members 35L and 35R) in each of the mounting members 37L and 37R. Although not shown in the drawing, a terminal connected to the battery BT is provided inside the accommodating portion 371. In addition thereto, power supplied from the battery BT is supplied to an image forming device 311 or a control unit which is connected thereto through a cable.

The heat insulating member 6F is provided on substantially the entire surface on the observer US side in each of the mounting members 37L and 37R. That is, the heat insulating member 6F is provided so as to cover at least the battery BT when seen from the observer US side. In other words, the heat insulating member is disposed between the observer US and the battery BT. The heat insulating member 6F is constituted by a sheet-shaped heat insulating material similar to the heat insulating member 6A, but may be formed by firmly fixing the foamed heat insulating material onto the surface. In addition, the heat insulating member 6F may be provided only in a region corresponding to the accommodating portion 371 on the surface of each of the mounting members 37L and 37R on the observer US side.

The heat insulating member 6F is provided in each of the mounting members 37L and 37R coming into contact with the temporal region and the occipital region of the observer US, and thus it is possible to suppress the radiation of heat of the battery BT, which is a heat generating body, to the observer US side. Therefore, it is possible to make the observer US less likely to feel the heat.

According to the above-described virtual image display device 1J of the present embodiment, it is possible to exhibit the same effects as those of the virtual image display device 1D.

Meanwhile, the battery BT is described as being accommodated in the accommodating portion 371, but may be attached to the mounting members 37 (37L, 37R) so that at least a portion thereof is exposed. That is, the accommodating portion 371 accommodating the battery BT therein may not be provided, or may be exposed to, for example, the opposite side to the observer US side.

Modification of Embodiment

The invention is not limited to the above-mentioned embodiment, but changes, modifications and the like within the range capable of achieving the object of the invention are included in the invention.

The light source device 3111 and the optical modulation device 3112 are integrated with each other by the fixation member 3113. However, the invention is not limited thereto. That is, the light source device 3111 and the optical modulation device 3112 may be integrated with each other without providing the fixation member 3113. For example, the light source device 3111 and the optical modulation device 3112 may be integrated with each other by being fixed to the cover members 34 and 35, or may be integrated with each other using an adhesive or the like. On the other hand, the light source device 3111 and the optical modulation device 3112 may not be integrated with each other. In this case, a configuration may be adopted in which the heat conduction member 5 comes into contact with each of the light source device 3111 and the optical modulation device 3112 so as to be capable of heat conduction.

The heat conduction member 5 is connected to the image forming device 311 or 314 or the control unit 23 so as to be capable of heat conduction. When the heat conduction member 5 is connected to a connection target so as to be capable of heat conduction, the manner of connecting the heat conduction member 5 does not matter. For example, the heat conduction member may be connected to a connection target such as the image forming device 311 using an adhesive capable of heat conduction, may be connected to the connection target by interposing a heat conduction paste in an intermediate portion of the heat conduction member, or may be fixed using a pin or the like which is capable of heat conduction. In addition, the heat conduction member may be connected to the connection target in a state where an end of the heat conduction member 5 is bent, is set to have an annular shape, or is set to have a rectangular shape. That is, the heat conduction member 5 may come into contact with a heat generating body such as the image forming device 311 and a heat radiating body such as the frame 33 or 33C or the second cover member 352 so as to be capable of heat conduction, and the heat radiating body is not limited to the frames 33 and 33C and the second cover member 352. In addition, the end of the heat conduction member 5 may be connected to a member capable of heat conduction, and the member may be connected to a connection target.

The heat conduction member 5 is connected to a position where a light path of light emitted from the image forming device 311 or 314 is not blocked. Specifically, in the first embodiment, the heat conduction member 5 is connected to the surface SF (surface SF on a side opposite to a light emission side) on a side opposite to the Z-direction of the light source device 3111. In addition, in the second to tenth embodiments, the heat conduction member 5 is connected to the surface SF on the opposite side, and a lateral side on a side opposite to the observer US in the image forming device 311. In addition, in the seventh embodiment, the heat conduction member 5 is connected to the surface 314B on a side opposite to the emission surface 314A in the image forming device 314. However, the invention is not limited thereto. That is, the heat conduction member 5 may come into contact with the image forming device 311 or 314 and a member of which at least a portion is exposed to the outside, so as to be capable of heat conduction, thereby allowing heat of the image forming device 311 to be transmitted to the member. For this reason, the heat conduction member 5 may be connected to, for example, a lateral side on the Y-direction side or the opposite side to the Y-direction side in the image forming device 311 or 314. The heat conduction member 5 connected to the image forming device 311 may be connected to at least one of the light source device 3111, the optical modulation device 3112, and the fixation member 3113, or may be connected to only the fixation member 3113. In addition, the heat conduction member 5 connected to the image forming device 314 may be connected to a surface other than the emission surface 314A or a region other than an image light emission region in the emission surface 314A.

The heat conduction member 5 is connected to the lateral side of the image forming device 311 on the opposite direction side to the observer US, and a portion on a side opposite to a portion connected to the lateral side on the opposite side in a surface of the heat conduction member 5 on the opposite direction side to the observer US comes into surface contact with a surface of the second cover member 352 on the observer US side. However, the invention is not limited thereto. For example, when heat of the image forming device 311 can be transmitted to the second cover member 352 with a good efficiency, the heat conduction member 5 may not be connected to the lateral side of the image forming device 311 on the opposite direction side to the observer US. Accordingly, the thickness of the side portion 3521 of the second cover member 352 can be made smaller, and thus it is possible to further reduce the heat resistance of the second cover member 352. Therefore, it is possible to radiate heat, transmitted from the image forming device 311 through the heat conduction member 5, from the second cover member 352 more efficiently.

The heat conduction member 5 connected to the second cover member 352 is connected to an inner surface which is a surface on the observer US side in the second cover member 352. However, the invention is not limited thereto. For example, in the second cover member 352 of the cover member 35, a heat radiation member (for example, a metal plate) capable of radiating heat to be transmitted may be provided at a position corresponding to a contact region with the heat conduction member 5 so as to pass through the second cover member 352 in the X-direction.

The heat conduction member 5 is constituted by a rectangular graphite sheet having flexibility. However, the invention is not limited thereto, and the heat conduction member 5 may be, for example, a metal material, having a thermal conductivity of equal to or greater than 100 W/mK, which does not have flexibility, or may be a plastic material including a filler material. That is, the heat conduction member 5 may have a thermal conductivity, and the material thereof does not matter. For this reason, a heat conduction path may be formed by bringing members having a thermal conductivity into contact with each other. In addition, the heat conduction member 5 may not have a rectangular shape.

The thickness dimension of the side portion 3511 (side portion 3511 facing the observer US) in the first cover member 351 of the cover member 35 is larger than the thickness dimension of the side portion 3521 on a side opposite to the observer US in the second cover member 352. However, the invention is not limited thereto. For example, the thickness dimension of the side portion 3511 and the thickness dimension of the side portion 3521 may be the same as each other, and the thickness dimension of the side portion 3511 may be smaller than the thickness dimension of the side portion 3521. At this time, the cover member 35 may be formed so that the thermal conductivity of the side portion 3511 becomes lower than the thermal conductivity of the side portion 3521. The same is true of the first cover member 341 and the second cover member 342 in the cover member 34.

A configuration is illustrated in which each of the display units 3, 3A, and 3C to 3F includes the left optical device 31L and the right optical device 31R. However, the invention is not limited thereto. That is, a configuration may be adopted in which the display unit includes one of the left optical device 31L and the right optical device 31R. In this case, a configuration in which the display unit 3 including one of the optical devices is supported by only one arm portion 4, for example, a configuration in which the left optical device 31L is supported by only the left arm portion 4 may be adopted, or a configuration in which the display unit is supported by a pair of arm portions 4 may be adopted.

The arm portions 4 (4L, 4R) are configured to be rotatable with respect to a connection region (rotating shaft portion 25) with the head band portion 2. However, the invention is not limited thereto. That is, the arm portions 4 may be fixed to the head band portion 2, or a configuration may be adopted in which, for example, the arm portion 4 includes a movable portion capable of adjusting the position of the display unit 3.

The light guide members 313L and 313R are fixed to the frames 33 and 33C, respectively. However, the invention is not limited thereto. For example, the light guide members 313L and 313R may be configured to be rotatable about the rotating shaft along the X-direction on a side opposite to the observer US, independently of each other or in conjunction with each other. In this case, the rotating shaft is configured to be located on the Y-direction side or the opposite side to the Y-direction in the light guide member 313, and thus the light guide member 313 can be retreated from the visual direction of the observer US by the rotation thereof.

In addition, a configuration is illustrated in which the control unit 23 is provided within the head band portion 2 or the holding member 32. However, the invention is not limited thereto. For example, in each of the virtual image display devices 1 and 1A to 1I, the control unit 23 may be provided in each of the display units 3, 3A, and 3C to 3F or each of the arm portions 4 (4L, 4R), or may be provided in the mounting member 36 or 37.

The headband portion 2 is connected to a controller, not shown in the drawing, which receives various types of input operations of the observer US, through the cable CB1, and a virtual image display device is controlled by the control unit 23 in accordance with operation information and image information from the controller. However, the invention is not limited thereto.

For example, in a configuration in which the controller is connected, one of the virtual image display device and the controller may have at least one of a function of acquiring operation information according to the operation of the observer US, a function of acquiring image information and driving the display unit in accordance with the image information, and a function of supplying power, and the other may have the remaining functions. In addition, the virtual image display device may be configured to recognize an observer's tapping operation or the like.

When the cover member 34 or 35 as a container having the image forming device 311 or 314 the control unit 23, the imaging unit 7, and the battery BT which is a heat generating body, disposed therein, the exterior case 21, and the accommodating portion 371 are seem from the observer US side, each of the heat insulating members 6A to 6F is disposed so as to cover the heat generating body. In other words, each of the heat insulating members 6A to 6F is disposed between the heat generating body as a target and the observer US. The heat generating body is not limited to the image forming devices 311 and 314, the control unit 23, the imaging unit 7, and the battery BT. For example, any type of heat generating body may be used insofar as the heat generating body constitutes a virtual image display device and generates heat during the use of the virtual image display device. Examples of the heat generating body include semiconductor elements of an arithmetic processing circuit such as a central processing unit (CPU) which is used for operation control and the like, an image processing circuit such as a graphics processing unit (GPU) which is used for image processing and the like, and a signal processing circuit used for signal processing and the like. In addition, the heat generating body also includes various types of light sources such as a self-luminous display panel, such as an organic EL panel, which is capable of being adopted instead of the light source device 3111 of the image forming device 311 or a laser light source (solid light source such as a laser diode (LD)) which emits laser beams. Further, when the image forming device is configured to include a device using a micro mirror such as a micro electro mechanical system (MEMS) mirror as described later, the device is also included in the heat generating body. That is, any type of body may be used as the heat generating body which is separated from the observer US by the heat insulating member.

The heat insulating member 6A is provided on at least any one of the inner surface 351A and the outer surface 351B of the first cover member 351 constituting a lateral side portion on the observer US side in the cover member 35, and the heat insulating member 6C is provided on at least any one of the inner surface and the outer surface of the internal lateral side portion 211 constituting a lateral side portion on the observer US side in the exterior case 21. However, the invention is not limited thereto. That is, when each of the heat insulating members 6A and 6C is disposed between a heat generating body and a lateral side portion on the observer US side in a container that accommodates the heat generating body therein, the arrangement position and arrangement structure of the heat insulating member do not matter. For this reason, each of the heat insulating members 6A and 6C may not come into contact with the inner surface 351A or the inner surface of the internal lateral side portion 211.

In addition, the heat insulating member 6E is provided on the surface on the observer US side in the mounting member 37. However, the invention is not limited thereto, the heat insulating member may be disposed at a position on the observer US side with respect to the battery BT within the accommodating portion 371.

Each of the heat insulating members 6A and 6C is constituted by a sheet-shaped heat insulating material. However, the invention is not limited thereto, the heat insulating member of the invention may have a structure in which a plurality of sheet-shaped heat insulating materials are superimposed on each other, may have a structure in which a plurality of sheet-shaped heat insulating materials are superimposed on each other so as to be separated from each other, or may have a structure in which a plurality of sheet-shaped heat insulating materials are bent so as to be superimposed on each other. In addition, the heat insulating member may have a structure in which another heat insulating material is filled into a gap formed when a plurality of sheet-shaped heat insulating materials are superimposed on each other or a gap formed when sheet-shaped heat insulating materials are bent so as to be superimposed on each other, and the heat insulating materials superimposed on each other may have different compositions. The heat resistance of a heat conduction path transmitted to the observer US side can be increased by the heat insulating member configured in this manner, and thus it is possible to further suppress heat conduction to the observer US side and to make the observer US less likely to feel heat.

Each of the heat insulating members 6A and 6C is formed in substantially a U-shape so as to cover not only a surface on the observer US side in the image forming device 311 or 314, which is a heat generating body, and the control unit 23 but also upper and lower portions (on the Y-direction side and the opposite direction side to the Y-direction) of the heat generating body. Similarly, each of the heat insulating members 6B and 6D is constituted by a heat insulating material which is filled so as to cover the heat generating body. However, the invention is not limited thereto, and the heat insulating member may not surround the heat generating body. In addition, the heat generating body may be completely surrounded insofar as heat of the heat generating body can be transmitted to the outside by the heat conduction member 5 or the like.

A heat conduction path configured to include the heat conduction member 5 that transmits heat of the image forming device 311 or 314, which is a heat generating body, to the outside of the cover member 34 or 35 may be formed within the cover member 34 or 35 as a container in which the heat insulating member 6A or 6B is provided. However, the invention is not limited thereto, and the heat conduction path may not be provided in a case where the necessity of suppressing a temperature rise of the heat generating body is not that high, such as a case where the heat generating body is configured to be resistant to heat. In addition, similarly to the attachment of the battery BT to the mounting member 37, a container accommodating the heat generating body therein may not necessarily be provided.

The holding member 32 includes the frame 33, and the cover member 34 or the cover member 35, and the holding member 32C includes the frame 33C, the cover member 34 or the cover member 35, and the mounting member 36. Each of the cover members 34 (34L, 34R) as containers includes the first cover member 341 which is located on the observer US side and the second cover member 342 which is located on a side opposite to the observer US side. Similarly, each of the cover members 35 (35L, 35R) as containers includes the first cover member 351 which is located on the observer US side and the second cover member 352 which is located on a side opposite to the observer US side. In the holding member 32 or 32C, one of the first cover member 341 (first accommodating portion) and the second cover member 342 (second accommodating portion) may be integrated with the frame 33 or 33C, and one of the first cover member 351 (first accommodating portion) and the second cover member 352 (second accommodating portion) may be integrated with the frame 33 or 33C. Among these members, when heat of the heat generating body is transmitted to at least any one of the frame and the second cover member, the heat is not likely to be transmitted to the first cover member which is located on the observer US side and is configured as a separate body. For this reason, it is possible to make the observer US less likely to feel heat from the first cover member and to simplify the configuration of the holding member.

Each of the virtual image display devices 1 and 1A to 1I may be connected to an image supply device, such as a PC, through a controller, or may be directly connected to the image supply device without going through a controller. In such a configuration, each of the virtual image display devices 1 and 1A to 1I may be used as an image display portion in the image supply device, and various types of operations of the virtual image display device 1 may be controlled by the image supply device. Meanwhile, in this case, the image supply device may supply power for driving each of the virtual image display devices 1 and 1A to 1I.

In addition, as in the virtual image display device 1I, a virtual image display device (for example, the headband portion 2 or each of the display units 3, 3A, and 3C to 3F) may include a battery and a processing circuit such as an image processing device, or may further include a slot such as a memory card. Further, the virtual image display device may be provided an operation unit that receives an operation of an observer US, or may be provided with a component capable of detecting a tapping operation. That is, a controller may not be provided.

The optical modulation device 3112 is constituted by a transmissive liquid crystal panel. However, the invention is not limited thereto. For example, the optical modulation device 3112 may be constituted by a reflective liquid crystal panel, or may be constituted by a device using a micro mirror such as a MEMS mirror.

In addition, the light guide member 313 includes a semi-transmissive layer, and is configured such that an observer US can visually recognize a virtual image by image light, emitted from the image forming device 311 or 314 and internally reflected by the semi-transmissive layer, being incident on the eyes. However, the invention is not limited thereto. For example, a configuration may be adopted in which a reflecting layer is provided at a position where the image within the light guide member is internally reflected, or a configuration may be adopted in which an image output through the image forming device 311 or 314 and the projection lens 312 is directly incident on the eyes of the observer US. That is, any configuration may be adopted insofar as image light output from the projection lens 312 is guided to the eyes of the observer US.

Each of the virtual image display devices 1 and 1A to 1J as image display devices according to the invention is configured as a see-through type virtual image display device. However, the invention is not limited thereto. That is, the invention can also be applied to a non-transmissive image display device incapable of observing the outside world or a video see-through type image display device displaying an image captured by an imaging element that captures an image of the outside world.

Each of the virtual image display devices 1 and 1A to 1J as image display devices according to the invention is a display device displaying an image which is visually recognized by an observer US as a virtual image. However, the invention is not limited thereto. For example, the invention can be applied to a device insofar as the device makes an observer US visually recognize an image. For example, a configuration may be adopted in which a liquid crystal panel, an organic electro-luminescence (EL) panel, or the like is disposed at positions corresponding to both eyes of an observer so that the observer visually recognizes a real image.

In addition, the invention can also be applied to a laser retina projection HMD. For example, the display unit 3 includes a laser light source and an optical system that guides the laser light source to the eyes of a user, and the invention may be applied to an HMD that makes a user visually recognize an image by scanning the retinas of the user with a laser beam incident on the eyes of the user and forming an image on the retinas.

The configurations described in the virtual image display devices 1 and 1A to 1J may be combined with each other. For example, each of the heat insulating members 6A and 6B may be adopted in the cover members 34 and 35 as containers, and each of the heat insulating members 6C and 6D may be adopted in the exterior case 21 as a container. Further, a virtual image display device may be configured so as to include a display unit having the cover member 34 or 35 provided with at least any one of the heat insulating members 6A and 6B, and a head band portion having the exterior case 21 provided with at least any one of the heat insulating members 6C and 6D.

The entire disclosure of Japanese Patent Application Nos. 2014-258728, filed Dec. 22, 2014 and 2015-187496, filed Sep. 24, 2015 are expressly incorporated by reference herein.

What is claimed is:

1. An image display device comprising:
   a display unit that displays an image so as to be visually recognized by an observer;
   a holding member that holds the display unit and has at least a portion thereof exposed to the outside; and
   a heat conduction member, having a sheet shape, which is connected to the holding member, wherein:
   the display unit includes an image forming device that forms the image,
   the heat conduction member comes into contact with the image forming device so as to be capable of heat conduction, and transmits heat of the image forming device to the holding member,
   the holding member includes a cover member and a frame that includes an upper surface and an end portion extending from the upper surface, the end portion defining a protrusion portion, the protrusion portion extending along a plane parallel to a plane on which the upper surface of the frame extends and protruding further from a user than the upper surface of the frame, and
   the heat conduction member contacts the protrusion portion.

2. The image display device according to claim 1, wherein the image forming device includes
   a light source device, and
   an optical modulation device that modulates light emitted from the light source device, and
   wherein the light source device and the optical modulation device are integrated with each other.

3. The image display device according to claim 1, wherein the heat conduction member is disposed at a position where a light path of light emitted from the image forming device is not blocked.

4. The image display device according to claim 1,
   wherein the display unit includes a light guide member making the image formed by the image forming device incident on the observer's eyes,
   wherein the holding member includes a frame, having at least a portion thereof exposed to the outside, which holds the light guide member at a position corresponding to the observer's eyes, and
   wherein the heat conduction member is connected to the frame so as to be capable of heat conduction.

5. The image display device according to claim 4,
   wherein the holding member includes a cover member accommodating the image forming device therein and engaging with the frame so that a portion of the frame is disposed therein, and
   wherein the heat conduction member is connected to the image forming device and a portion of the frame within the cover member so as to be capable of heat conduction.

6. The image display device according to claim 1,
   wherein the display unit includes a light guide member making the image formed by the image forming device incident on the observer's eyes,
   wherein the holding member includes
   a frame that holds the light guide member at a position corresponding to the observer's eyes, and
   a cover member that engages with the frame and accommodates the image forming device therein, and
   wherein the heat conduction member is connected to a region on an opposite side to the observer in the cover member.

7. The image display device according to claim 6, wherein a thermal conductivity of the region on an opposite side to the observer in the cover member is higher than a thermal conductivity of a region on the observer side.

8. The image display device according to claim 7, wherein a thickness dimension of the region on a side opposite to the observer in the cover member is smaller than a thickness dimension of the region on the observer side.

9. The image display device according to claim 1, further comprising:
   a mounting portion that has a shape along a head of the observer and is mounted on the head of the observer; and
   a connecting portion that connects the mounting portion and the holding member,
   wherein the mounting portion has a heat radiation portion radiating heat of the image forming device which is transmitted from the holding member through the connecting portion, and
   wherein the heat radiation portion is provided on an opposite side to the head of the observer in the mounting portion.

10. A head mounted image display device comprising:
    a display unit that displays an image so as to be visually recognized by an observer;
    a holding member that holds the display unit and has at least a portion thereof exposed to the outside;
    a mounting member that is connected to the holding member, has a shape along a head of the observer, and is mounted on the head of the observer; and a heat conduction member, having a sheet shape, which is connected to the holding member, wherein:

the display unit includes an image forming device that forms the image;

the heat conduction member comes into contact with the image forming device so as to be capable of heat conduction and transmits heat of the image forming device to the holding member;

the holding member includes a cover member and a frame that includes an upper surface and an end portion extending from the upper surface, the end portion defining a protrusion portion, the protrusion portion extending along a plane parallel to a plane on which the upper surface of the frame extends and protruding further from a user than the upper surface of the frame, and the heat conduction member contacts the protrusion portion.

* * * * *